(12) United States Patent  
Kulkarni et al.

(10) Patent No.: US 11,201,391 B2  
(45) Date of Patent: Dec. 14, 2021

(54) METHODS FOR BEAM MANAGEMENT IN VEHICLE

(71) Applicant: Samsung Electronics Co., Ltd., Suwon-si (KR)

(72) Inventors: Mandar Narsinh Kulkarni, Richardson, TX (US); Boon Loong Ng, Plano, TX (US); Jianhua Mo, Garland, TX (US); Pengda Huang, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 16/590,213

(22) Filed: Oct. 1, 2019

(65) Prior Publication Data

US 2020/0112087 A1 Apr. 9, 2020

Related U.S. Application Data

(60) Provisional application No. 62/740,657, filed on Oct. 3, 2018.

(51) Int. Cl.
*H04B 7/15* (2006.01)
*H01Q 1/32* (2006.01)
(Continued)

(52) U.S. Cl.
CPC .......... *H01Q 1/3291* (2013.01); *B60S 1/0862* (2013.01); *B60S 1/0896* (2013.01);
(Continued)

(58) Field of Classification Search
CPC ......... H04W 4/02; H04W 4/06; H04W 52/28; H04W 64/00; H04W 68/00; H04B 7/0639;
(Continued)

(56) References Cited

U.S. PATENT DOCUMENTS 9,554,415 B1 * 1/2017 Ho .................... H04W 24/10  
10,356,789 B2 7/2019 Raghavan et al.  
(Continued)

FOREIGN PATENT DOCUMENTS

EP 1621405 B1 9/2007  
GB 2536718 A 9/2016  
(Continued)

OTHER PUBLICATIONS

International Search Report and Written Opinion of the International Searching Authority in connection with International Application No. PCT/KR2019/012925, dated Jan. 17, 2020, 11 pages.

*Primary Examiner* — Blane J Jackson

(57) ABSTRACT

Methods and apparatus for relay aided beam management in a vehicle communication system are provided. The relay comprises an antenna system including an internal antenna located inside a vehicle and an external antenna located outside the vehicle. The relay further comprises a transceiver operably connected to the antenna system, the transceiver configured to receive, from a base station (BS), a first signal via the external antenna of the antenna system, and receive, from the vehicle, configuration information including at least one of a vehicle speed, or a position of a window of the vehicle or windshield wiper. The relay further comprises a processor operably connected to the antenna system and the transceiver, the processor configured to generate a second signal based on (i) the configuration information and (ii) the first signal, wherein the transceiver is further configured to transmit, to a user equipment (UE), the second signal via the internal antenna.

20 Claims, 19 Drawing Sheets

(51) Int. Cl.
  *H04W 64/00*  (2009.01)
  *H04L 5/00*   (2006.01)
  *B60S 1/08*   (2006.01)
  *H04B 7/06*   (2006.01)
  *H04B 7/204*  (2006.01)

(52) U.S. Cl.
  CPC ......... *H01Q 1/3208* (2013.01); *H04B 7/0639* (2013.01); *H04B 7/204* (2013.01); *H04L 5/0055* (2013.01)

(58) Field of Classification Search
  CPC ...... H04B 7/0695; H04B 7/0691; H04B 7/15; H04B 7/1555; H04B 7/204; H01Q 21/205; H01Q 1/32; H01Q 1/3208; H01Q 1/3291; H04L 5/0055
  See application file for complete search history.

(56) References Cited

U.S. PATENT DOCUMENTS

| | | |
|---|---|---|
| 2011/0305172 A1 | 12/2011 | Dean |
| 2013/0035090 A1 | 2/2013 | Moshfeghi |
| 2013/0077502 A1* | 3/2013 | Gainey .............. H04B 7/15578 370/252 |
| 2017/0141837 A1* | 5/2017 | Cook ....................... H04B 7/12 |
| 2017/0317742 A1 | 11/2017 | Feria et al. |
| 2021/0044926 A1* | 2/2021 | Talluri .................. H04W 4/025 |

FOREIGN PATENT DOCUMENTS

| | | |
|---|---|---|
| KR | 10-2017-0096628 A | 8/2017 |
| WO | 2019229147 A1 | 12/2019 |

* cited by examiner

METHODS FOR BEAM MANAGEMENT IN VEHICLE

CROSS-REFERENCE TO RELATED APPLICATIONS AND CLAIM OF PRIORITY

The present application claims priority to U.S. Provisional Patent Application Ser. No. 62/740,657 filed on Oct. 3, 2018. The content of the above-identified patent documents is incorporated herein by reference.

TECHNICAL FIELD

The present disclosure relates generally to a wireless communication system. In particular, the present disclosure relates to beam management in a vehicle.

BACKGROUND

A communication system includes a downlink (DL) that conveys signals from transmission points such as base stations (BSs) or eNodeBs to user equipments (UEs) and an uplink (UL) that conveys signals from the UEs to reception points such as eNodeBs. A UE, also commonly referred to as a terminal or a mobile station, may be fixed or mobile and may be a cellular phone, a personal computer device, etc. an eNodeB, which is generally a fixed station, may also be referred to as an access point or other equivalent terminology.

SUMMARY

Embodiments of the present disclosure provide methods and apparatuses for beam management in vehicle.

In one embodiment, a relay for beam management in a vehicle communication system is provided. The relay comprises an antenna system including an internal antenna located inside a vehicle and an external antenna located outside the vehicle. The relay further comprises a transceiver operably connected to the antenna system, the transceiver configured to receive, from a base station (BS), a first signal via the external antenna of the antenna system, and receive, from the vehicle, configuration information including at least one of a vehicle speed, or a position of a window of the vehicle or a windshield wiper. The relay further comprises a processor operably connected to the antenna system and the transceiver, the processor configured to generate a second signal based on (i) the configuration information and (ii) the first signal, wherein the transceiver is further configured to transmit via the internal antenna, to a user equipment (UE), the second signal.

In another embodiment, a relay for beam management in a vehicle communication system is provided. The relay comprises an antenna system including an internal antenna located inside a vehicle and an external antenna located outside the vehicle. The relay further comprises a transceiver operably connected to the antenna system, the transceiver configured to receive, from the vehicle, configuration information including at least one of a vehicle speed, or a position of a window of the vehicle or windshield wiper and receive, from UE, a first signal via the internal antenna of the antenna system based on the configuration information. The relay further comprises a processor operably connected to the antenna system and the transceiver, the processor configured to generate a second signal based on the first signal, wherein the transceiver is further configured to transmit, to a base station (BS), the second signal via the external antenna of the antenna system.

In yet another embodiment, a user equipment (UE) for beam management in a vehicle communication system is provided. The UE comprises a transceiver configured to receive, from at least one relay of a group of relays, a second signal, wherein the at least one relay of the group of relays includes an external antenna located inside a vehicle and an external antenna located outside the vehicle, and wherein the second signal is determined based on (i) a first signal that is received, from a base station (BS), by the at least one relay of the group of relays and (ii) configuration information, received from a vehicle, including at least one of a vehicle speed, or a position of a window of the vehicle or windshield wiper. The UE further comprises a processor operably connected to the transceiver, the processor configured to generate a command based on the received second signal, wherein the transceiver is further configured to transmit, to the at least one relay of the group of relays, the command.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
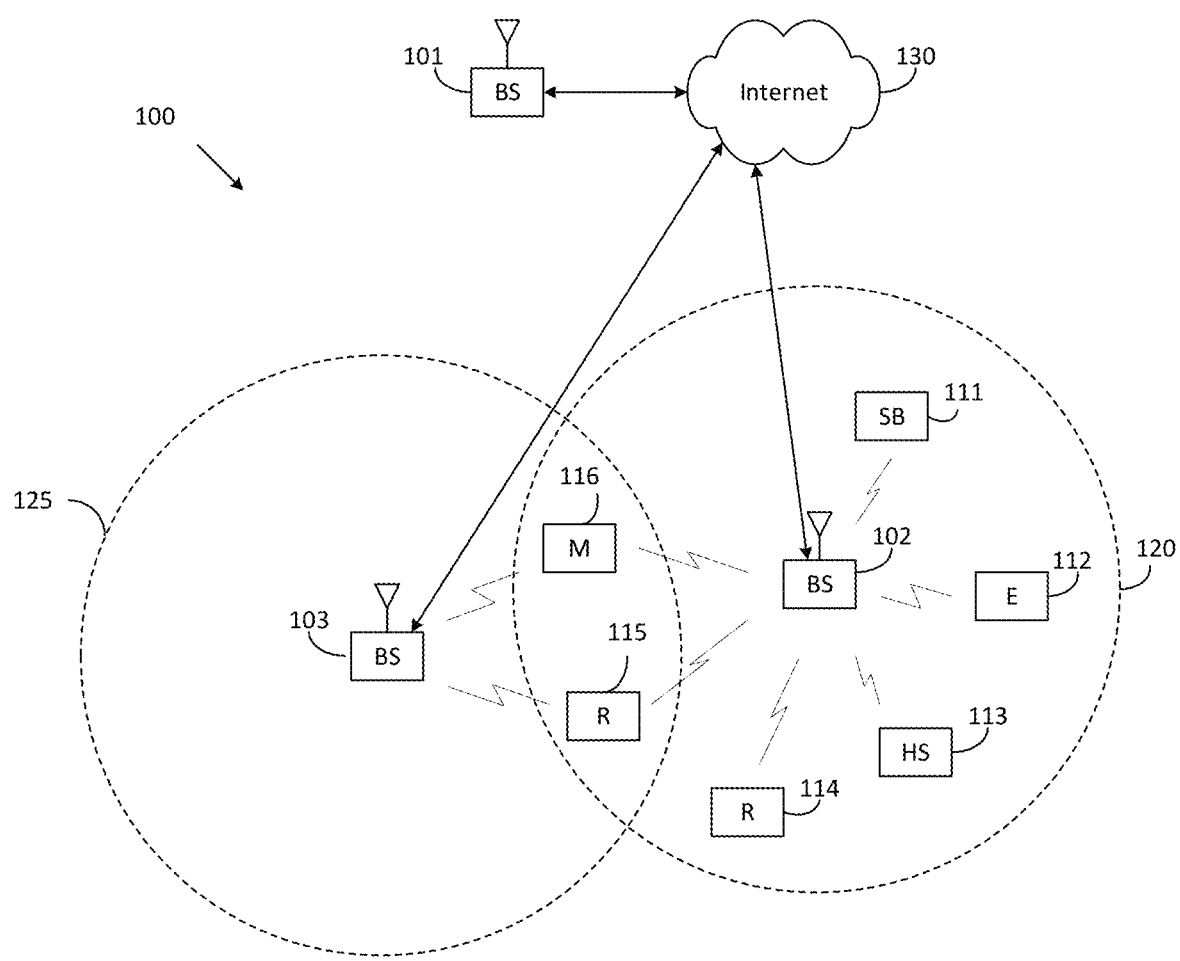
FIG. 1 illustrates an example wireless network according to embodiments of the present disclosure.

FIG. 1 through FIG. 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
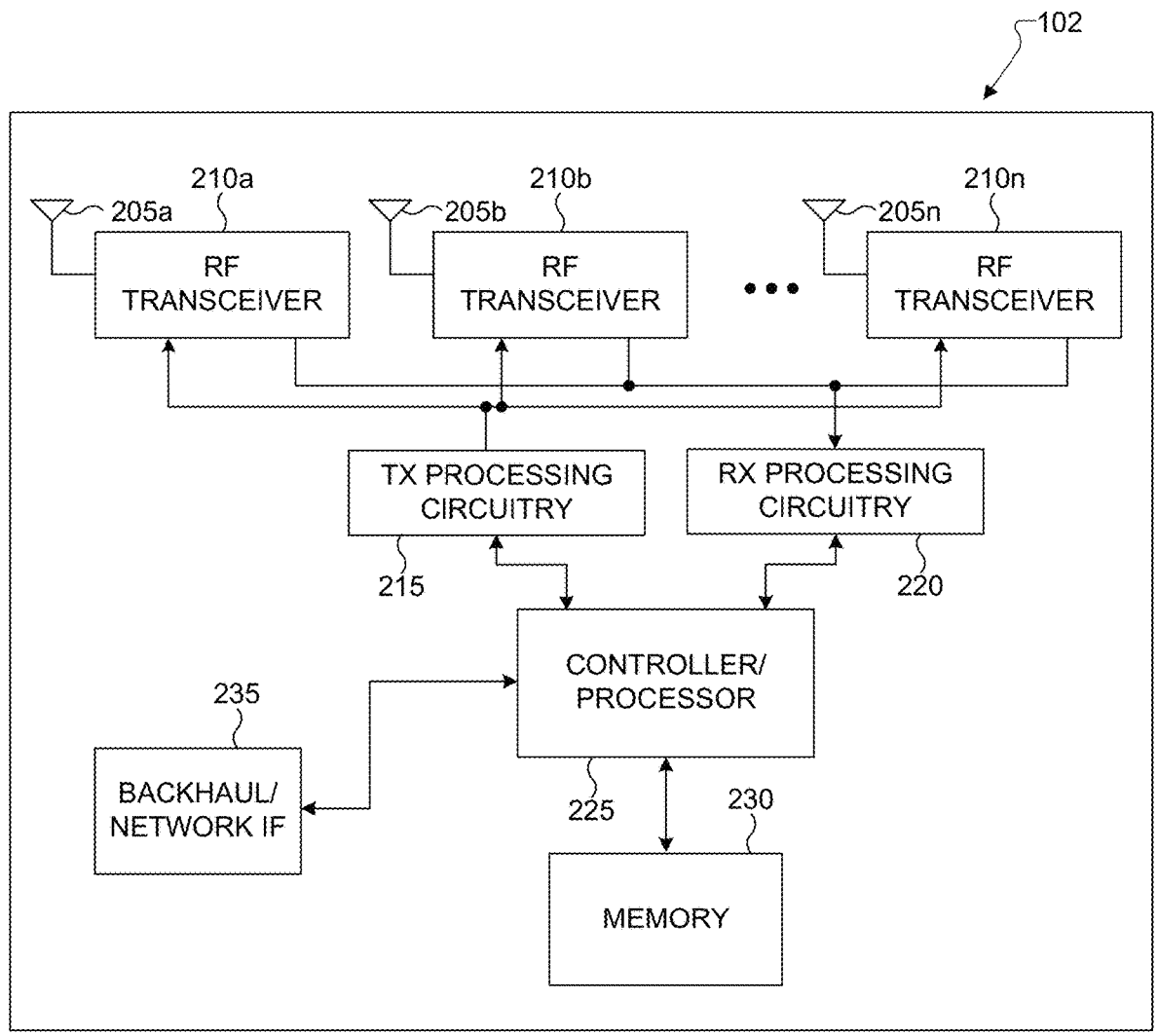
FIG. 2 illustrates an example gNB according to embodiments of the present disclosure.
Figure 3:
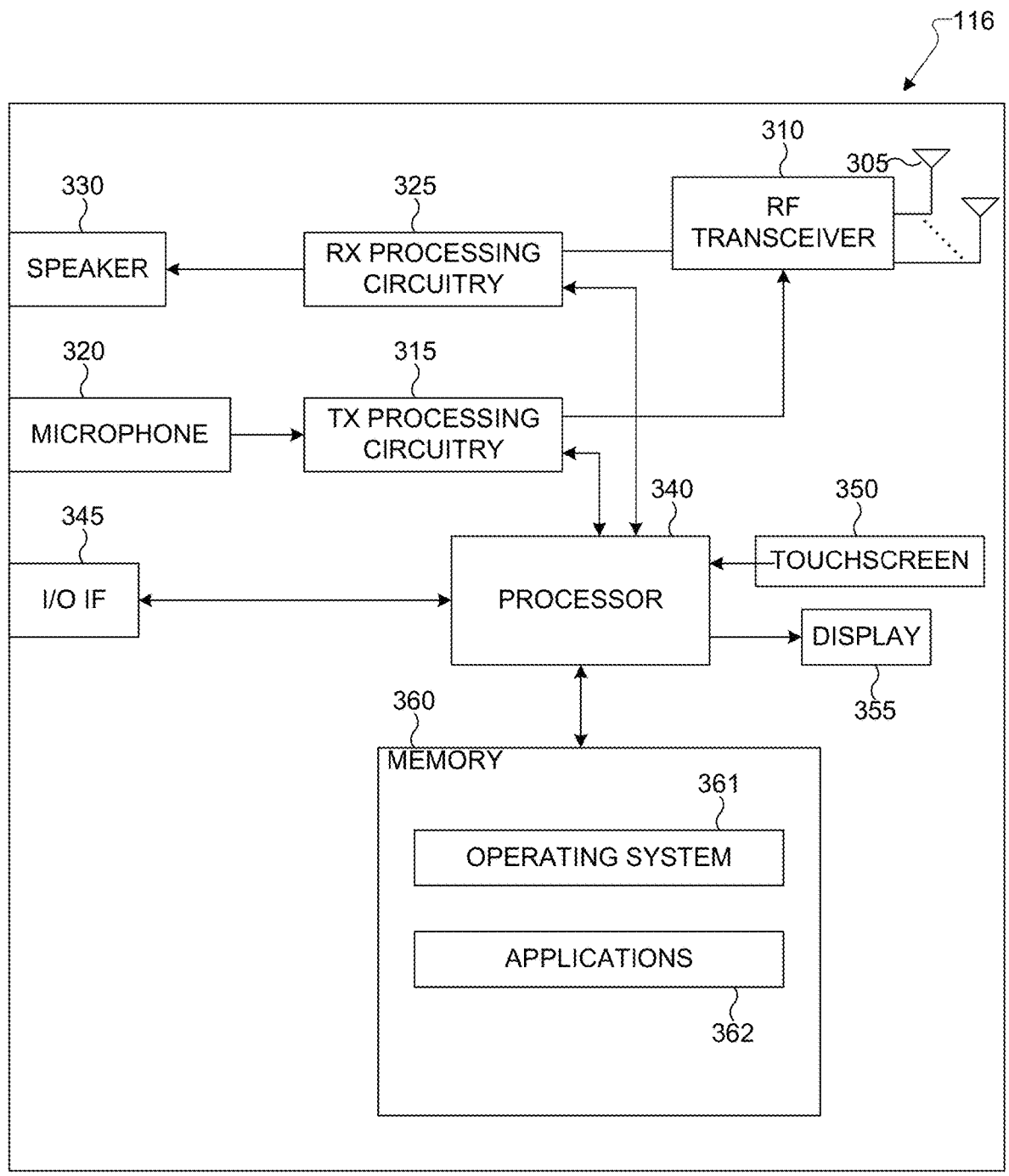
FIG. 3 illustrates an example UE according to embodiments of the present disclosure.

FIGS. 1-3 below describe various embodiments implemented in wireless communications systems. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient beam management in a vehicle for an advanced communication system. In certain embodiments, and one or more of the gNBs 101-103 includes circuitry, programing, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
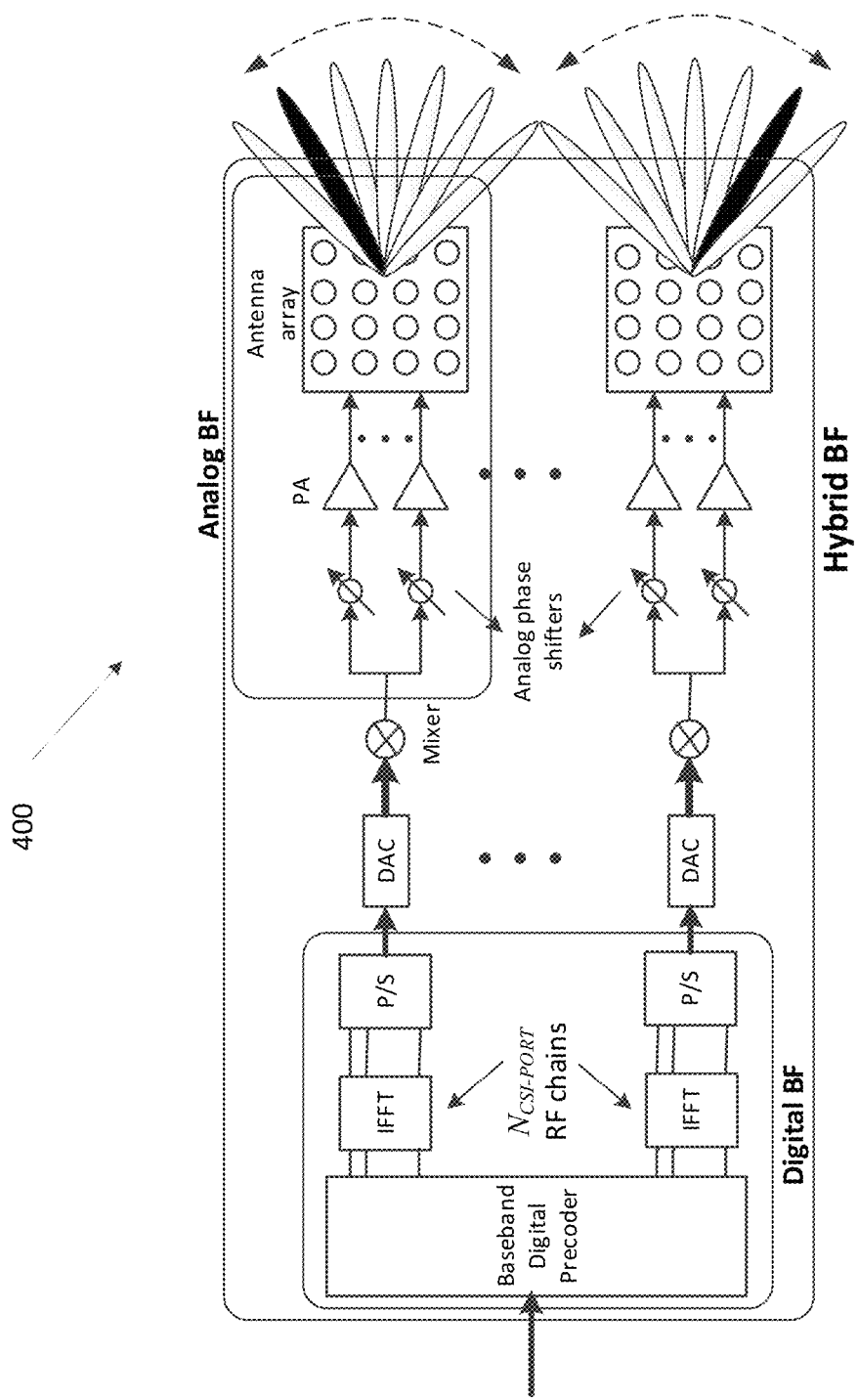
FIG. 4 illustrates an example hybrid beamforming according to embodiments of the present disclosure.

FIG. 4 illustrates an example antenna blocks 400 according to embodiments of the present disclosure. The embodiment of the antenna blocks 400 illustrated in FIG. 4 is for illustration only. FIG. 4 does not limit the scope of the present disclosure to any particular implementation of the antenna blocks 400.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 4. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Figure 5:
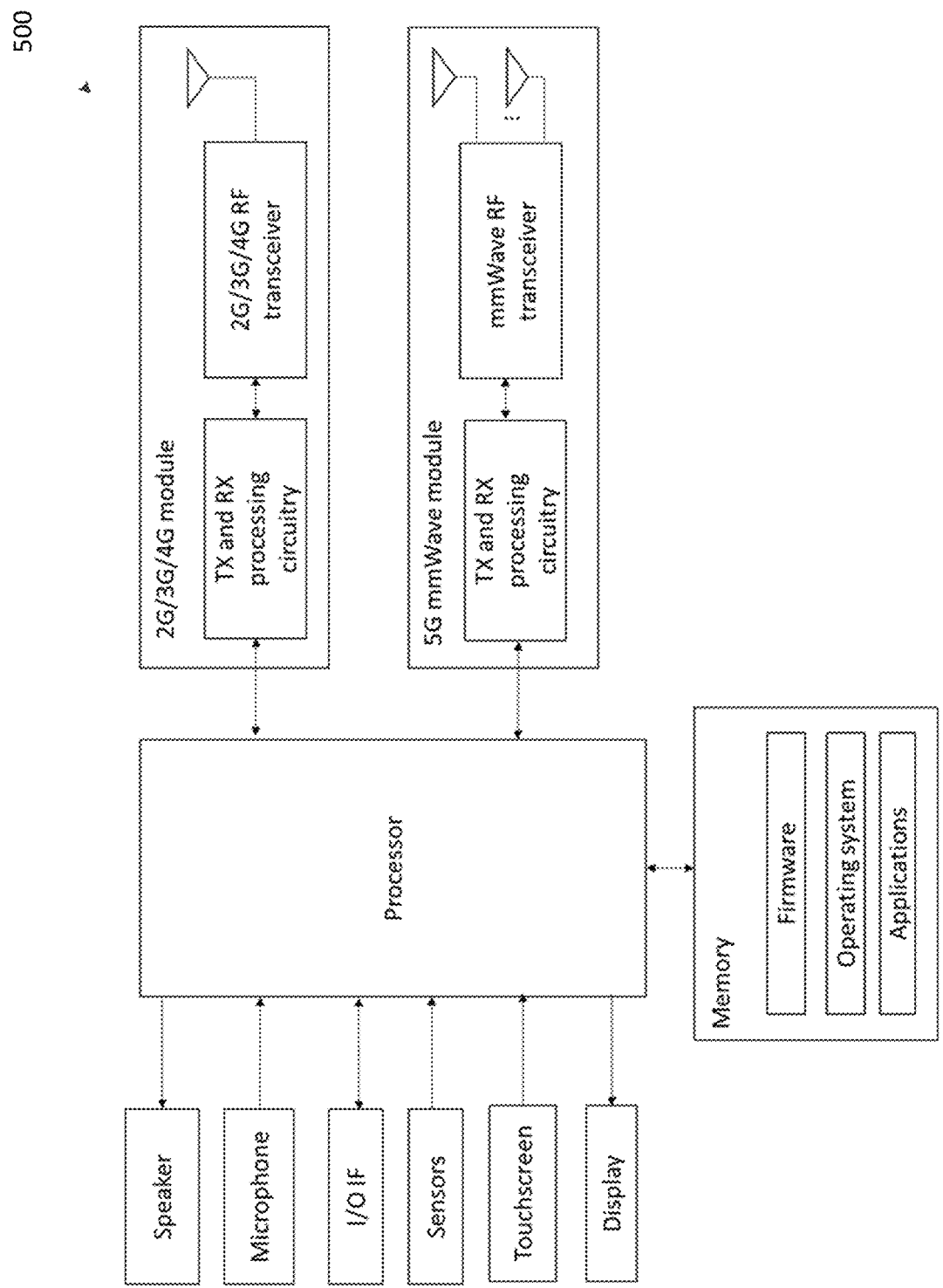
FIG. 5 illustrates another example UE according to embodiments of the present disclosure.

FIG. 5 illustrates another example UE 500 according to embodiments of the present disclosure. The embodiment of the UE 500 illustrated in FIG. 5 is for illustration only. FIG. 5 could have the same or similar configuration. FIG. 5 does not limit the scope of the present disclosure to any particular implementation.

As shown in FIG. 5, a UE includes a 2G/3G/4G communication module and a 5G mmWave communication module. Each communication module includes one or more antennas, one radio frequency (RF) transceiver, transmit (TX) and receive (RX) processing circuitry. The UE also includes a speaker, a processor, an input/output (I/O) interface (IF), one or more sensors (touch sensor(s), proximity sensor(s), gyroscope, etc.), a touchscreen, a display, and a memory. The memory includes, a firmware, an operating system (OS) and one or more applications.

The RF transceiver receives, from the antenna, an incoming RF signal transmitted by an eNB/gNB of the network. The RF transceiver down-converts the incoming RF signal to generate an intermediate frequency (IF) or baseband signal. The IF or baseband signal is sent to the RX processing circuitry, which generates a processed baseband signal by filtering, decoding, and/or digitizing the baseband or IF signal. The RX processing circuitry transmits the processed baseband signal to the processor for further processing (such as for voice or web browsing data).

The TX processing circuitry receives outgoing baseband data (such as voice, web data, e-mail, or interactive video game data) from the processor. The TX processing circuitry encodes, multiplexes, and/or digitizes the outgoing baseband data to generate a processed baseband or IF signal. The RF transceiver receives the outgoing processed baseband or IF signal from the TX processing circuitry and up-converts the baseband or IF signal to an RF signal that is transmitted via the antenna.

The processor can include one or more processors and execute the basic OS program stored in the memory in order to control the overall operation of the UE. In one such operation, the main processor controls the reception of forward channel signals and the transmission of reverse channel signals by the RF transceiver, the RX processing circuitry, and the TX processing circuitry in accordance with well-known principles. The main processor can also include processing circuitry configured to allocate one or more resources.

For example, the processor can include allocator processing circuitry configured to allocate a unique carrier indicator and detector processing circuitry configured to detect a physical downlink control channel (PDCCH) scheduling a physical downlink shared channel (PDSCH) reception of a physical uplink shared channel (PUSCH) transmission in one of the carriers. Downlink Control Information (DCI) serves several purposes and is conveyed through DCI formats in respective PDCCHs. For example, a DCI format may correspond to a downlink assignment for PDSCH receptions or to an uplink grant for PUSCH transmissions. In some embodiments, the processor includes at least one microprocessor or microcontroller.

The processor is also capable of executing other processes and programs resident in the memory, such as operations for inter-eNB/gNB coordination methods to support inter-eNB/gNB carrier aggregation. It should be understood that inter-eNB/gNB carrier aggregation can also be referred to as dual connectivity. The processor can move data into or out of the memory as required by an executing process. In some embodiments, the processor is configured to execute a plurality of applications, such as applications for MU-MIMO communications, including obtaining control channel elements of PDCCHs. The processor can operate the plurality of applications based on the OS program or in response to a signal received from an eNB/gNB. The main processor is also coupled to the I/O interface, which provides UE with the ability to connect to other devices such as laptop computers and handheld computers. The I/O interface is the communication path between these accessories and the main controller.

The processor is also coupled to the touchscreen and the display. The operator of the UE can use the touchscreen to enter data into the UE. The display may be a liquid crystal display, light emitting diode display, or other display capable of rendering text and/or at least limited graphics, such as from web sites.

The memory is coupled to the processor. Part of the memory could include a random access memory (RAM), and another part of the memory could include a Flash memory or other read-only memory (ROM).

Although FIG. 5 illustrates one example of UE, various changes may be made to FIG. 5. For example, various components in FIG. 5 could be combined, further subdivided, or omitted and additional components could be added according to particular needs. As a particular example, the processor could be divided into multiple processors, such as one or more central processing units (CPUs) and one or more graphics processing units (GPUs). Also, while FIG. 5 illustrates the UE configured as a mobile telephone or smartphone, UEs could be configured to operate as other types of mobile or stationary devices.

A 5G terminal or UE can be equipped with multiple radio front-end (RF) modules (e.g., circuit) where each module has an antenna array based on the architecture as illustrated in FIG. 4. Certain architecture may also allow an RF module to have more than one antenna array. Each RF module (e.g. circuit) is capable of generating RF beams with phase shifters, or with phase shifters as well as amplitude weights. The multiple RF modules may or may not be simultaneously active for transmission or reception. Usually, more simultaneously active RF modules would imply larger power consumption.

It should be noted that further embodiments of the invention may be derived by utilizing a combination of several of the embodiments listed below. It should also be noted that further embodiments of the invention may be derived by utilizing a particular subset of operational steps as disclosed in each of these embodiments. This disclosure of invention should be understood to cover all such embodiments.

Figure 6:
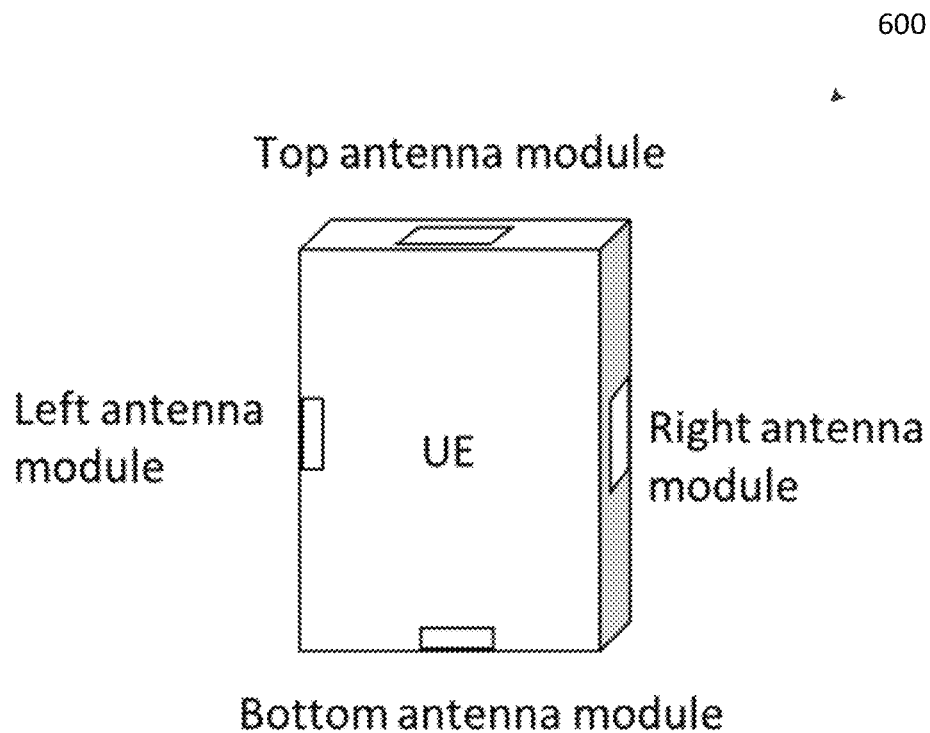
FIG. 6 illustrates an example UE with multiple antenna modules according to embodiments of the present disclosure.

FIG. 6 illustrates an example UE 600 with multiple antenna modules according to embodiments of the present disclosure. The embodiment of the UE 600 illustrated in FIG. 6 is for illustration only. FIG. 6 could have the same or similar configuration. FIG. 6 does not limit the scope of the present disclosure to any particular implementation.

As illustrated in FIG. 6, a UE can be equipped with one or more antenna modules, where each antenna module can consist of one or more antenna arrays. An example UE with four antenna modules located at different locations is shown in FIG. 6.

In one embodiment, the signals received at multiple antenna modules can be selected or combined with the objective of maximizing a performance metric, such as the desired signal power, signal-to-noise ratio (SNR), signal-to-interference ratio (SIR), or signal-to-interference-and-noise ratio (SINR). The objective for combining the signals from multiple antenna modules could also be dependent on certain external configuration information that is available to a UE. For instance, a UE inside a vehicle may have access to the information about vehicle configuration in terms of whether the windows are open or closed, or whether the windshield wiper is ON or OFF (could be indicative of the rain present or not) or whether vehicle is moving at a fast speed or not. Such information can be used for deciding how to combine signals from the multiple antenna modules. For instance, if the windows are closed or if it is raining outside, a UE may choose to combine signals from multiple RF modules using SNR maximization since the UE is likely power limited. However, if the conditions are favorable for signal propagation (not raining and windows open), or if a UE battery is low, the UE may choose to activate only signal antenna module or may choose to combine signals from multiple RF modules based on SINR or SIR maximization.

Interference can come from the signals transmitted by a neighboring BS and can be identified by detecting and measuring the synchronization signals transmitted by the neighboring BS. For performance metrics that require minimization of the interference power (maximization of SINR or SIR), the performance can be improved if the antenna module that is receiving significant amount of interference power can be turned off, or if a certain attenuation can be applied to the received signal of the antenna module, e.g. in baseband or in the Rx processing circuit in the RF module (e.g. circuit). Attenuation instead of turn-off can be beneficial for robust mobility management because the presence of neighboring BS for potential handover can still be detectable by the UE.

Figure 7:
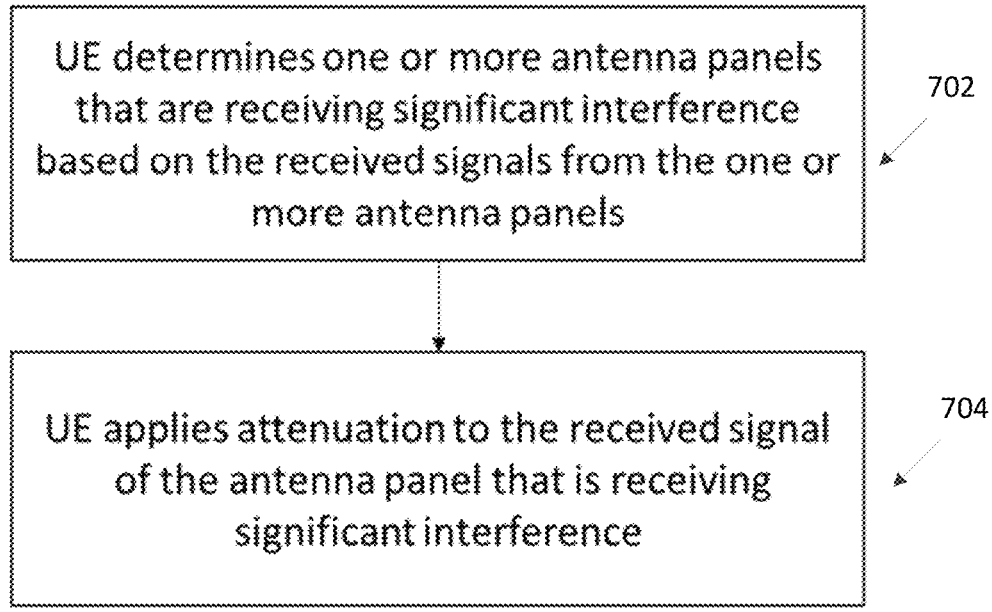
FIG. 7 illustrates an example UE procedure to attenuate interference according to embodiments of the present disclosure.

FIG. 7 illustrates an example UE procedure 700 to attenuate interference according to embodiments of the present disclosure. The embodiment of the UE procedure 700 illustrated in FIG. 7 is for illustration only. FIG. 7 could have the same or similar configuration. FIG. 7 does not limit the scope of the present disclosure to any particular implementation.

In one example, as illustrated in FIG. 7, in step 702, a UE first determines one or more antenna panels that are receiving significant interference based on the received signals from the one or more antenna panels. The UE then in step 704 applies attenuation to the received signal of the antenna panel that is receiving significant interference. The determination of an antenna panel with significant interference can be done independently of the other antenna module. The procedure is illustrated in FIG. 7.

Figure 8:
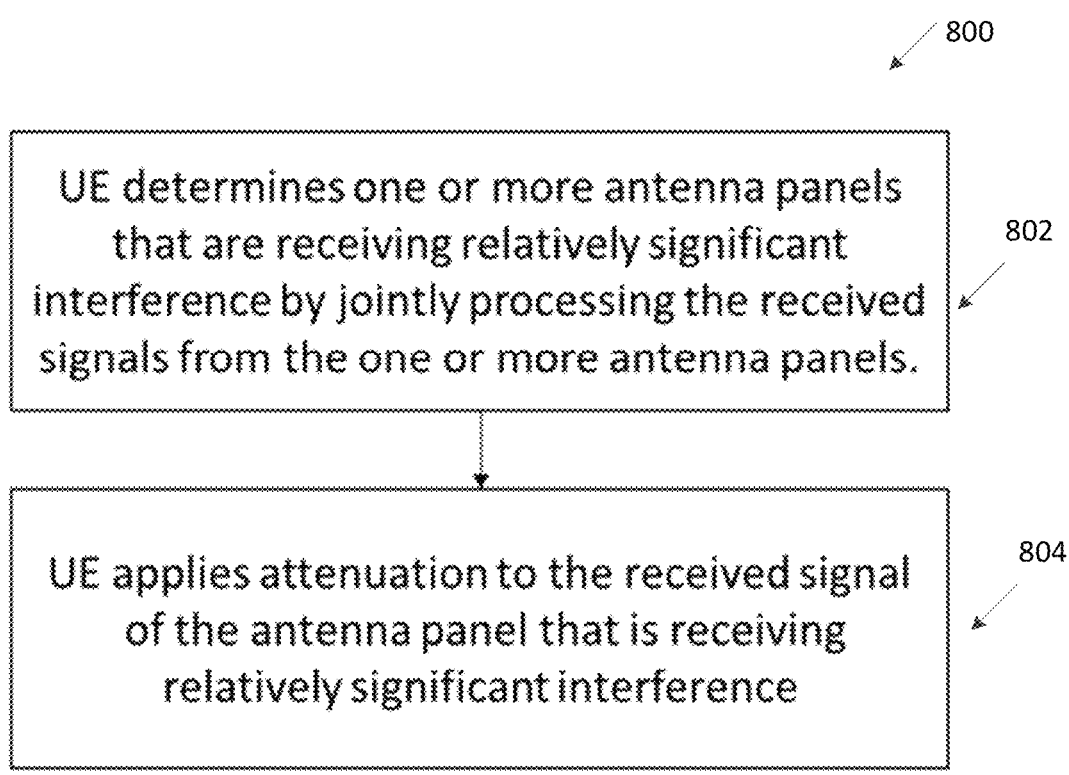
FIG. 8 illustrates another example UE procedure to attenuate interference according to embodiments of the present disclosure.

FIG. 8 illustrates another example UE procedure 800 to attenuate interference according to embodiments of the present disclosure. The embodiment of the UE procedure 800 illustrated in FIG. 8 is for illustration only. FIG. 8 could have the same or similar configuration. FIG. 8 does not limit the scope of the present disclosure to any particular implementation.

In one example, as illustrated in FIG. 8, a UE in step 802 first determines one or more antenna panels that are receiving relatively significant interference by jointly processing the received signals from the one or more antenna panels. The joint processing can be comparing the SIR or SINR based on the received signal of each panel. The UE in step 804 then applies attenuation to the received signal of the antenna panel that is determined to receive relatively significant interference. The procedure is illustrated in FIG. 8.

Figure 9:
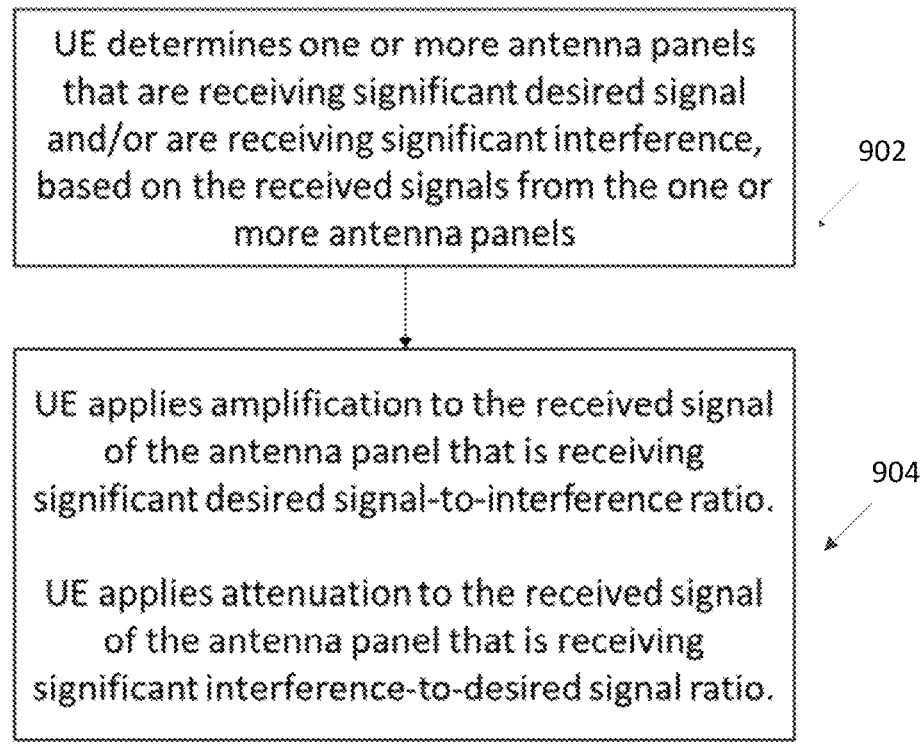
FIG. 9 illustrates an example UE procedure to amplify desired signal and attenuate interference according to embodiments of the present disclosure.

FIG. 9 illustrates an example UE procedure 900 to amplify desired signal and attenuate interference according to embodiments of the present disclosure. The embodiment of the UE procedure 900 illustrated in FIG. 9 is for illustration only. FIG. 9 could have the same or similar configuration. FIG. 9 does not limit the scope of the present disclosure to any particular implementation.

In one example, as illustrated in FIG. 9, a UE in step 902 first determines one or more antenna panels that are receiving significant desired signal and/or significant interference based on the received signals from the one or more antenna panels. The UE in step 904 then applies amplification to the received signal of the antenna panel that is receiving significant desired signal-to-interference ratio. The UE then applies attenuation to the received signal of the antenna panel that is receiving significant interference-to-desired signal ratio. The procedure is illustrated in FIG. 9.

A similar procedure involving joint processing of received signals such as that illustrated in FIG. 8 is also possible and is omitted here for brevity since it is straightforward. If the UEs can have digital processing, then more sophisticated combining of the received signal from multiple panels can be done, for instance using minimum mean squared error estimation (MMSE) or zero-forcing (ZF) based receive filters.

Figure 10:
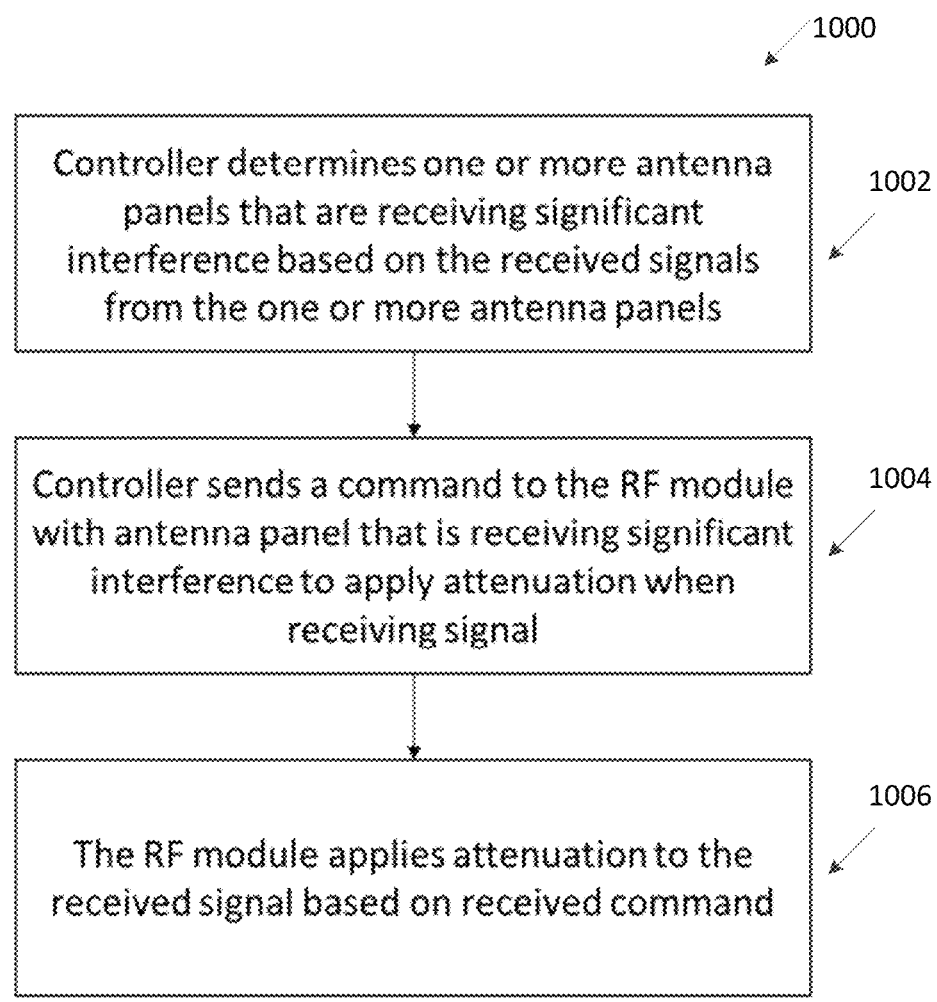
FIG. 10 illustrates an example implementation to attenuate interference according to embodiments of the present disclosure.

FIG. 10 illustrates an example implementation 1000 to attenuate interference according to embodiments of the present disclosure. The embodiment of the implementation 1000 illustrated in FIG. 10 is for illustration only. FIG. 10 could have the same or similar configuration. FIG. 10 does not limit the scope of the present disclosure to any particular implementation.

In one example, the received signal amplification/attenuation function of an antenna panel can be performed with a variable-gain amplifier (VGA) at the RF receiver signal chain in the analog domain (before analog-to-digital converter (ADC)) of the antenna panel. The function that determines the decision to amplify/attenuate can be performed by the application processor of the UE which can be suitable for procedure involving joint processing (e.g. as illustrated in FIG. 8).

The function can also be performed by the Rx processing circuit in the RF module (e.g. RF circuit), which can be suitable for procedure without joint processing (such as illustrated in FIG. 7). Referring to FIG. 10, for the procedure as illustrated in FIG. 7, in step 1002 there can be a controller that determines one or more antenna panels that are receiving significant interference based on the received signals from the one or more RF modules, the controller in step 1004 then sends a command to the RF module with antenna panel that is receiving significant interference to apply attenuation to received signals. The RF module in step 1006 then applies attenuation to the received signal based on the received command.

In a certain condition, a radio link between a UE inside a vehicle such as a car and a base station can be significantly worse than if the UE is located outside of the vehicle at the same spot. This can be caused by the window coating that reflects solar energy in order to maintain temperature in the cabin without too much air conditioning. As a result, when the UE is inside such a vehicle, the data rate that can be received or transmitted by the UE may reduce significantly. In the worst case, radio link failure or outage may occur when the UE is in the vehicle. The present disclosure provides embodiments to overcome this problem.

Figure 11:
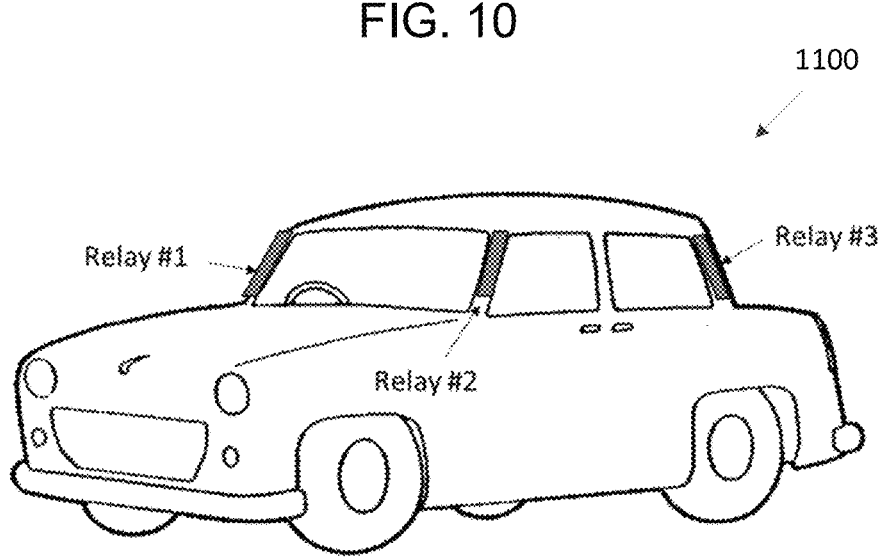
FIG. 11 illustrates an example car equipped with relays according to embodiments of the present disclosure.

FIG. 11 illustrates an example car equipped with relays 1100 according to embodiments of the present disclosure. The embodiment of the car equipped with relays 1100 illustrated in FIG. 11 is for illustration only. FIG. 11 could have the same or similar configuration. FIG. 11 does not limit the scope of the present disclosure to any particular implementation.

In one embodiment, a vehicle such as a car can be equipped with one or more relays, where each relay includes one or more antenna modules (e.g. circuit) that transmit and/or receive signals external to the car, and another one or more antenna modules (e.g. circuit) that transmit and/or receive signals in the car cabin. Each antenna module can include one or more antenna arrays. An example with three antenna modules located at different locations of the car chassis is shown in FIG. 11. Other placements such as on the front windshield and the back windshield are also possible. A type of relay that can be suitable for the present disclosure is the repeater, but other types of relays are not precluded.

Figure 12:
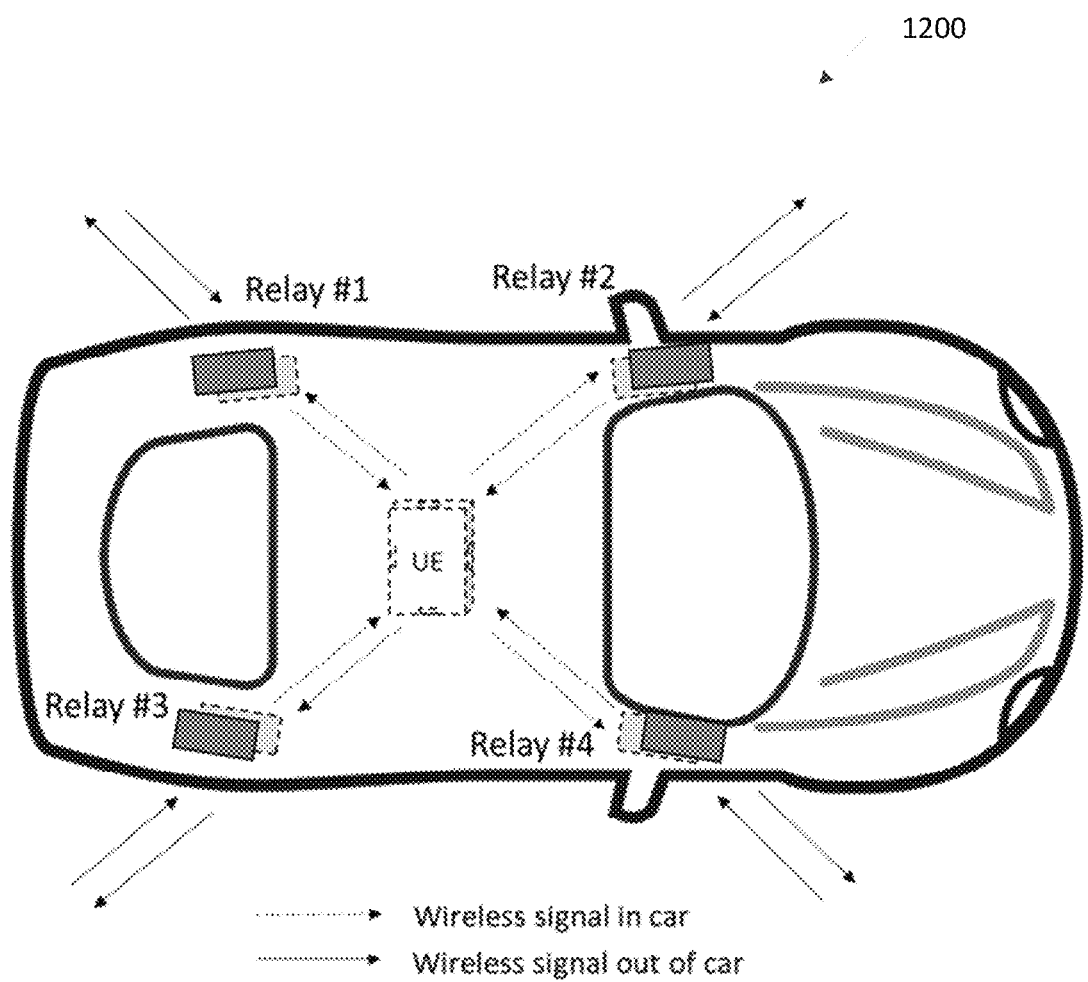
FIG. 12 illustrates another example car equipped with relays according to embodiments of the present disclosure.

FIG. 12 illustrates another example car equipped with relays 1200 according to embodiments of the present disclosure. The embodiment of the car equipped with relays 1200 illustrated in FIG. 12 is for illustration only. FIG. 12 could have the same or similar configuration. FIG. 12 does not limit the scope of the present disclosure to any particular implementation.

FIG. 12 illustrates a UE in a vehicle and four relays installed on the vehicle. The UE transmits signals to and/or receives signals from one or more of the relays (with the internal antenna panels of the relays). The relays transmit signals to and/or receive signals from base stations (with the external antenna panels of the relays). The relay can relay signals into and out of the vehicle if for a frequency division duplexing (FDD) system and in a time division duplexing (TDD) system if the TDD timing is known or can be configured to the relay.

For TDD without the knowledge of TDD timing information at the relay, only one directional relay (either downlink (DL) or uplink (UL)) can be possible; in this case, in order to support relaying in both downlink and uplink, some of the relays can be configured to be downlink relays and the others can be uplink relays.

For the example as illustrated in FIG. 12, relay #1 and relay #4 can be DL relays, whereas relay #2 and relay #3 can be UL relays. Since the external coverage (outside of the car) of relay #1 and relay #4 are largely orthogonal (and similarly, relay #2 and relay #3), such configuration/design can enhance both the DL and the UL coverage of the TDD system. It can be possible to enable in-band operation of the DL and UL relays making use of the directionality of the relays. If relay #1 and relay #2 have beams that do not overlap, it can be possible for DL and UL transmissions to coexist in same time-frequency resources. Similar to the duplexing done by external antennas of the 4 relays, the inside antennas can operate in TDD or FDD mode for DL to UL or vice versa interference isolation.

In one embodiment, the signals received at multiple relays can be selected or combined with the objective of maximizing a performance metric, such as the desired signal power, SNR, SIR, or SINR. Interference can come from the signals transmitted by a neighboring BS and can be identified by detecting and measuring the synchronization signals transmitted by the neighboring BS. For performance metrics that require minimization of the interference power (maximization of SINR or SIR), the performance can be improved if the relay that is receiving significant amount of interference power at the external antenna panel of the relay can be turned off, or if a certain attenuation can be applied to the received signal of the external antenna module of the relay, e.g., in baseband or in the Rx processing circuit in the RF module of the relay. Attenuation instead of turn-off can be beneficial for robust mobility management because the presence of neighboring BS for potential handover can still be detectable by the UE in the vehicle.

Figure 13:
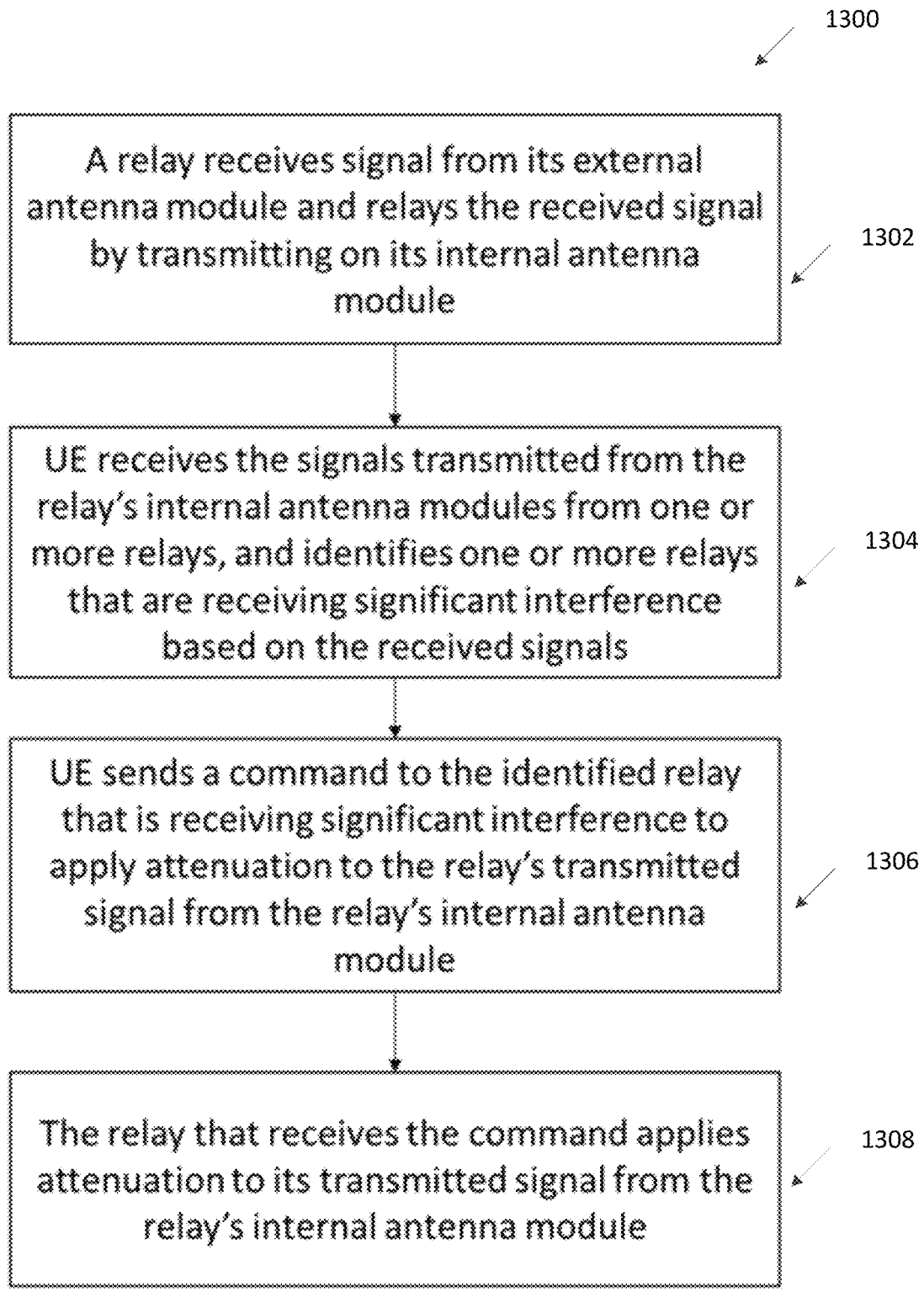
FIG. 13 illustrates an example UE procedure to control attenuation of relay's signals according to embodiments of the present disclosure.

FIG. 13 illustrates an example UE procedure 1300 to control attenuation of relay's signals according to embodiments of the present disclosure. The embodiment of the UE procedure 1300 illustrated in FIG. 13 is for illustration only. FIG. 13 could have the same or similar configuration. FIG. 13 does not limit the scope of the present disclosure to any particular implementation.

In one example, as illustrated in FIG. 13, in step 1302, a relay receives signal from an external antenna module and relays the received a signal by transmitting on the internal antenna module. In step 1304, a UE receives the signals transmitted from one or more relays' internal antenna modules and identifies the relays that are receiving significant interference. The UE in step 1306 then sends a command to the identified relays for the relays to apply attenuation to their relayed signals. In step 1308, the relay that receives the command applies attenuation to the transmitted signal from the relay's internal antenna module. The procedure is illustrated in FIG. 13. Although the exemplary procedure relies on just attenuation of relayed signals, the UE is not precluded to suggest the relays to pass the received signal through a filter for cancelling the interference.

Figure 14:
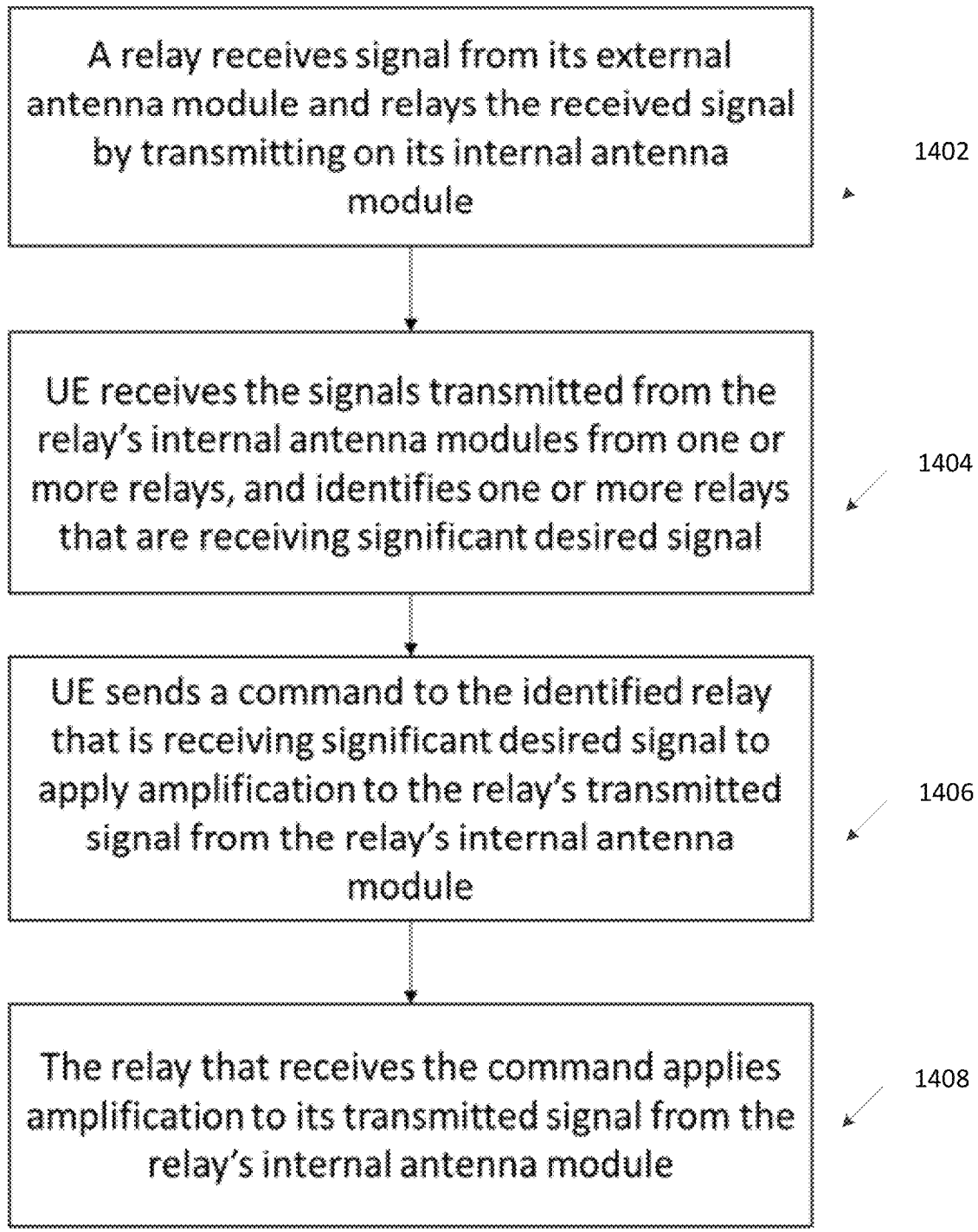
FIG. 14 illustrates an example UE procedure to control amplification of relay's signals according to embodiments of the present disclosure.

FIG. 14 illustrates an example UE procedure 1400 to control amplification of relay's signals according to embodiments of the present disclosure. The embodiment of the UE procedure 1400 illustrated in FIG. 14 is for illustration only.

FIG. 14 could have the same or similar configuration. FIG. 14 does not limit the scope of the present disclosure to any particular implementation.

As illustrated in FIG. 14, in step 1402, a relay receives signal from the external antenna module of the relay and relays the received signal by transmitting on the internal antenna module of the relay. In step 1404, a UE receives the signals transmitted from the relay's internal antenna modules from one or more relays and identifies one or more relays that are receiving significant desired signal. In step 1406, the UE sends a request to the identified relay that is receiving significant desired signal to apply amplification to the relay's transmitted signal from the relay's internal antenna module. In step 1408, the relay that receives the command applies amplification to the transmitted signal from the relay's internal antenna module.

The magnitude of amplification in step 1406 could be dependent on the battery power of the UE or other UE configuration. It may also be dependent on the vehicle configuration including but not limited to windows being open or closed, windshield wipers ON or OFF, or vehicle speed. Instead of amplifying and forwarding request in step 1406, a UE may also request decode and forward with amplification. For instance, if the UE battery is low the UE may request decode and forward with amplification in order to reduce its overhead of having to request for retransmission of packets if it cannot decode the amplify and forward signal from the relay.

Figure 15:
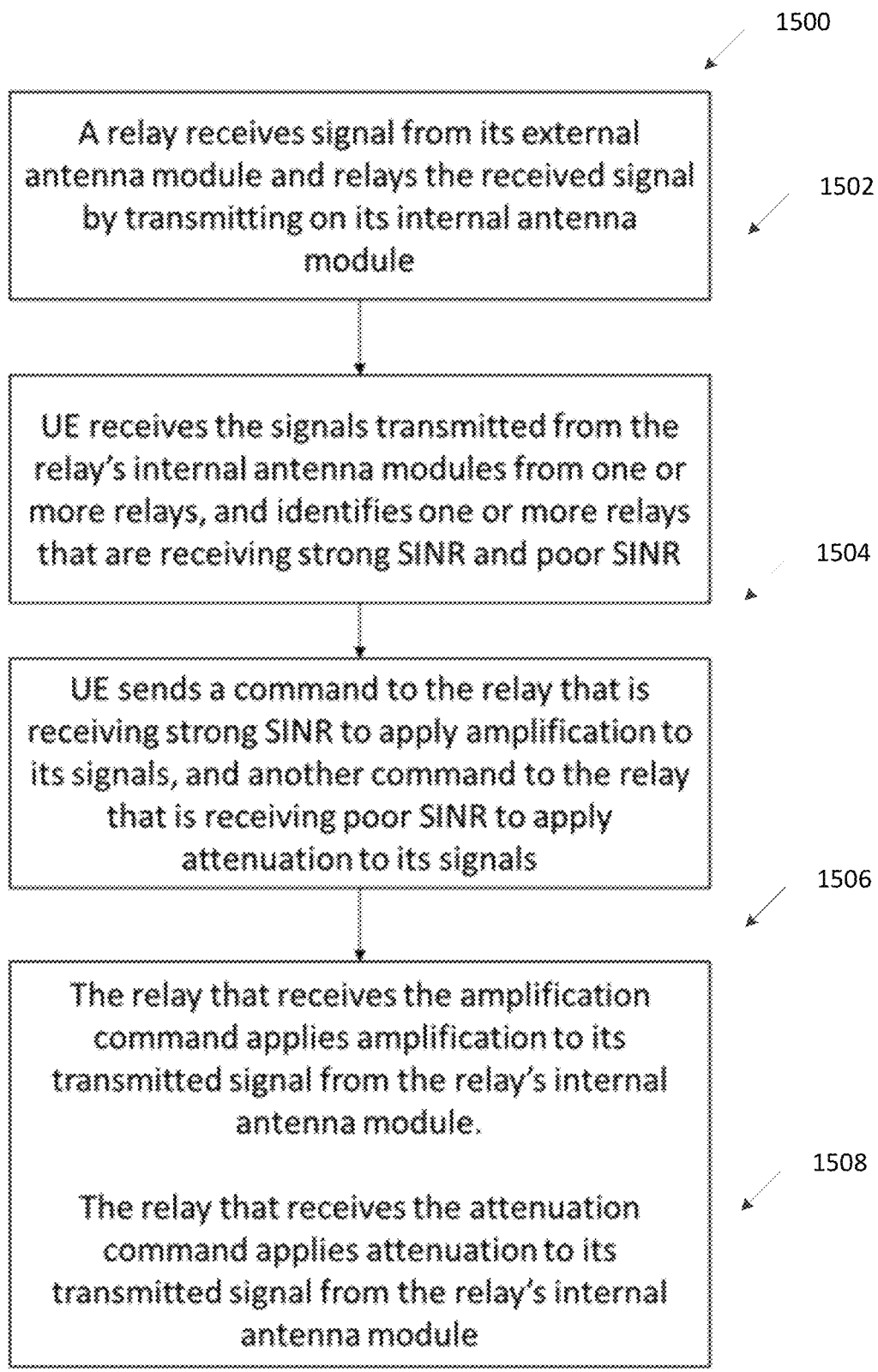
FIG. 15 illustrates an example UE procedure to control amplification/attenuation of relay's signals according to embodiments of the present disclosure.

FIG. 15 illustrates an example UE procedure 1500 to control amplification/attenuation of relay's signals according to embodiments of the present disclosure. The embodiment of the UE procedure 1500 illustrated in FIG. 15 is for illustration only. FIG. 15 could have the same or similar configuration. FIG. 15 does not limit the scope of the present disclosure to any particular implementation.

As illustrated in FIG. 15, in step 1502, a relay receives signal from the external antenna module of the relay and relays the received signal by transmitting on the internal antenna module of the relay. In step 1504, a UE receives the signals transmitted from the relay's internal antenna modules from one or more relays and identifies one or more relays that are receiving strong SINR and poor SINR. In step 1506, the UE sends a command to the identified relay that is receiving strong SINR to apply amplification to the signals, and another command to the relay that is receiving poor SINR to apply attenuation to the signals. In step 1508, the relay that receives the amplification command applies to the transmitted signal from the relay's internal antenna module.

In step 1508, the relay that receives the attenuation command applies attenuation to the transmitted signal from the relay's internal antenna module.

Figure 16:
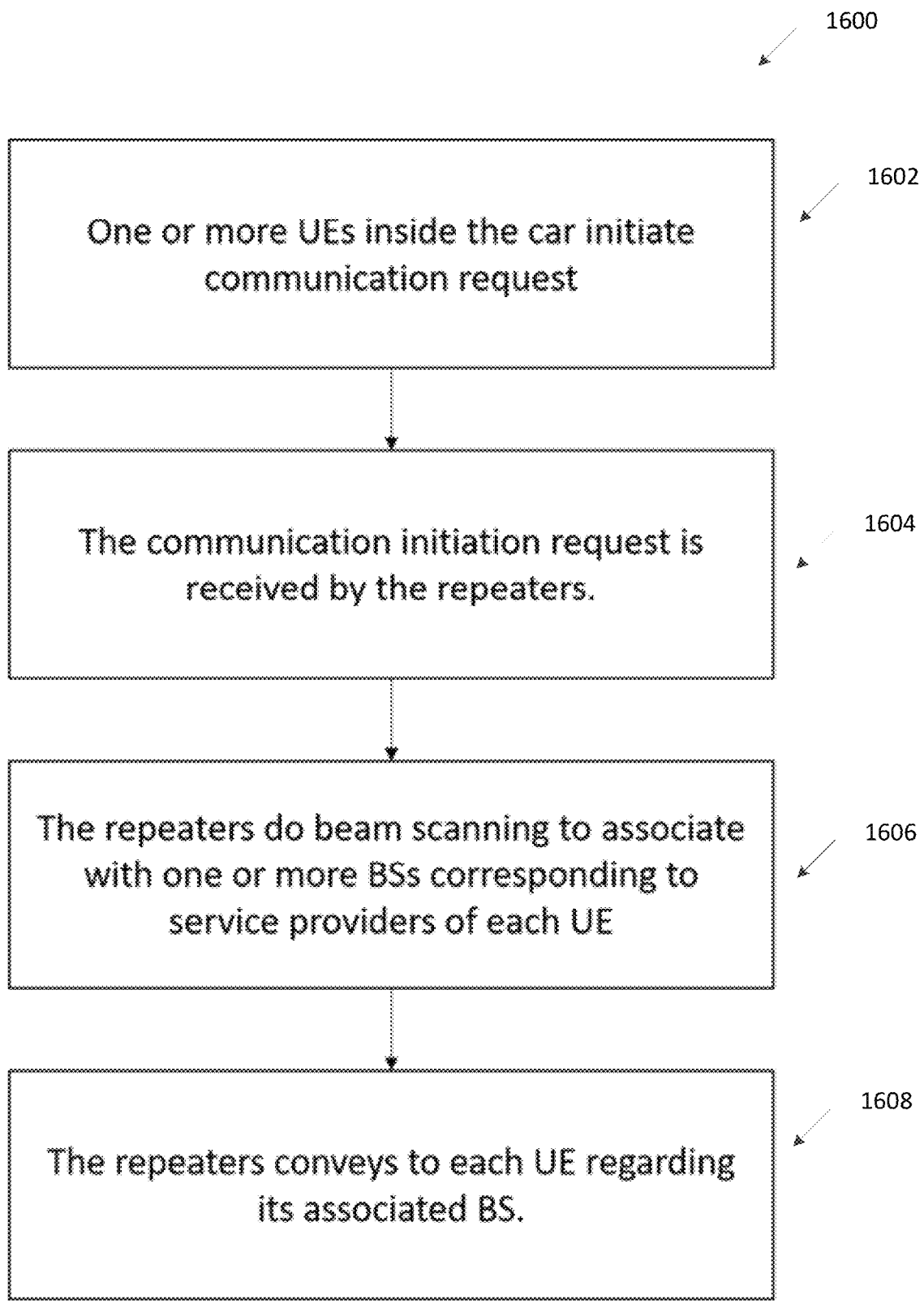
FIG. 16 illustrates an example mechanism for initial access for UEs inside the car according to embodiments of the present disclosure.

FIG. 16 illustrates an example mechanism for initial access 1600 for UEs inside the car according to embodiments of the present disclosure. The embodiment of the mechanism for initial access 1600 illustrated in FIG. 16 is for illustration only. FIG. 16 could have the same or similar configuration. FIG. 16 does not limit the scope of the present disclosure to any particular implementation.

As illustrated in FIG. 16, in step 1602, one or more UEs include the car initiate communication request. In step 1604, the communication initiation request is received by the repeater. In step 1606, the repeaters do beam scanning to associate with one or more BSs corresponding to service providers of each UE. In step 1608, the repeaters convey to each UE regarding the associated BS.

Note that it is not necessary for a UE to employ an initial access through the repeater as shown in FIG. 16. Depending on the vehicle configuration, for instance all windows open, or a UE configuration, for instance battery power, the UE may or may not directly initiate a communication request with a base station instead of requesting a repeater to establish the downlink and/or uplink communication with the network. If the UE connects to a base station B0 directly since windows were open and if the windows close after some time or the battery power is low, the UE may request connection to one or more repeaters on the vehicle. A repeater may or may not have already established connection with a base station B1 of the network and the future uplink or downlink communication for the UE proceeds via the repeater.

There can be similar procedure for the UE to send command to one or more relays to for the relays to apply amplification to their relayed signals. An example is given in FIG. 14. Another example procedure that enables the UE to control the amplification or attenuation according to the relative strength of the desired signal compared to the interference is given in FIG. 15.

Figure 17:
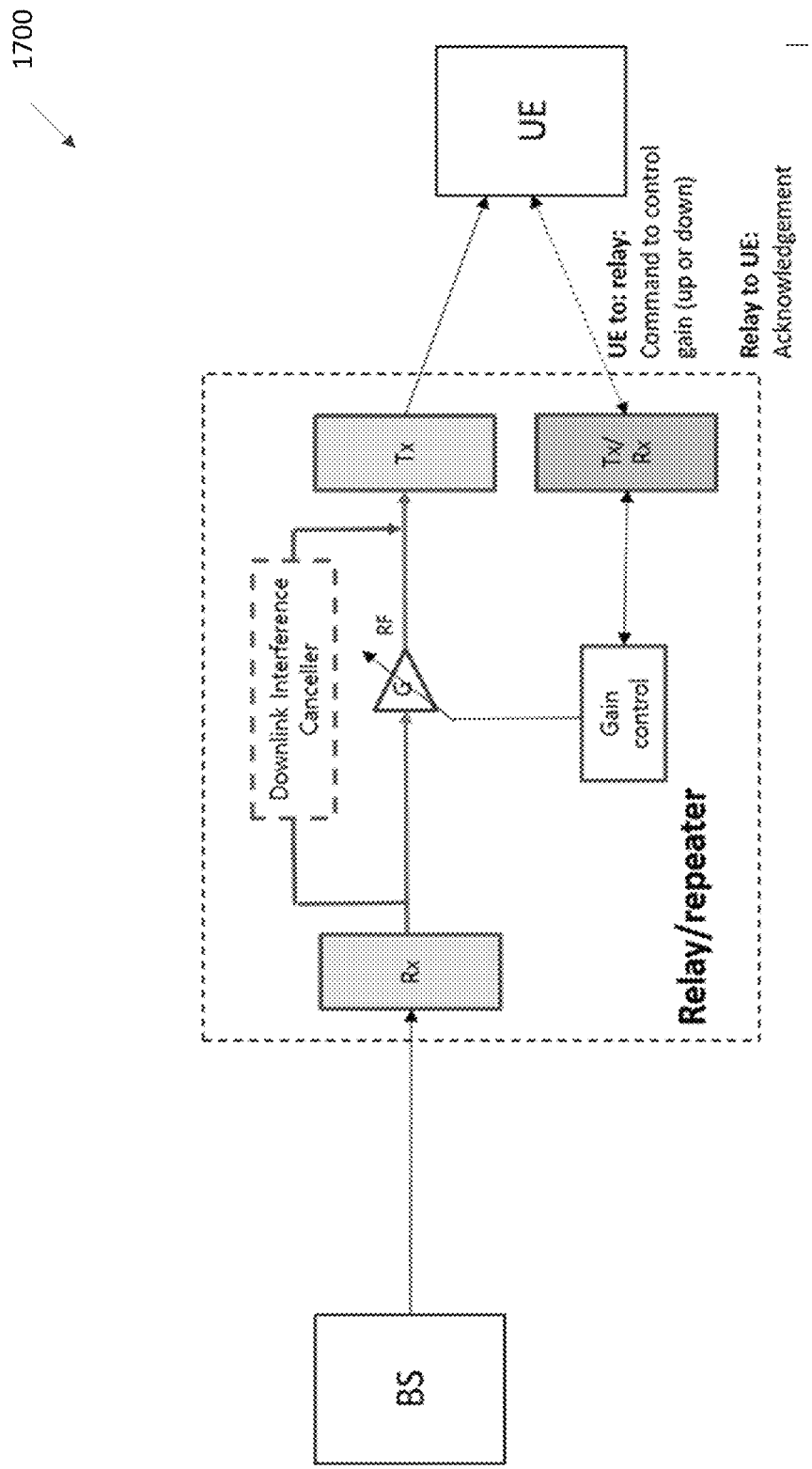
FIG. 17 illustrates an example downlink repeater architecture according to embodiments of the present disclosure.

FIG. 17 illustrates an example downlink repeater architecture 1700 according to embodiments of the present disclosure. The embodiment of the downlink repeater architecture 1700 illustrated in FIG. 17 is for illustration only. FIG. 17 could have the same or similar configuration. FIG. 17 does not limit the scope of the present disclosure to any particular implementation.

The UE's command to the relays can be transmitted wirelessly over a control channel. The control channel can be based on Bluetooth, Wi-Fi, LTE/NR D2D and the like. FIG. 17 shows an example repeater architecture for downlink, where a separate Tx/Rx to process the control channel is shown. The command sent by the UE to the relay can be a gain step up or a gain step down. Upon receiving the command, the relay can send an acknowledgement, the gain control module then executes the step up or step-down command.

In one embodiment, a scheme for enabling connection of one or more UEs inside a car with outdoor BSs through the relays on the car is provided. FIG. 16 summarizes the methodology. One or more UEs send a connection request to the relays on the car via some multiple access mechanism, for instance slotted Aloha. Depending on the service provider information of the UEs, the relays search for a common BS or different BSs for serving the UEs inside the car. This decision may be done by the relays based on UE commands or relays can have a mechanism to collect information from all UEs and make a decision.

The repeaters perform beam scanning mechanism on frequency bands for all the operators serving the UEs under consideration. The beam scanning mechanism can be performed through any algorithm including the popular hierarchical search. Once the connection between BSs and relays is done, the relays convey the information of which BS serves which UE to the UEs.

In one embodiment, each UE suggests a codebook to be used for beam scanning to the relay. The codebook suggestions from UEs may be based on prior information of the location of the UE. If multiple UEs suggest different codebooks, then the relays pick either of the suggested codebooks blindly or perform some more processing locally to decide which codebook to use—for example choose codebook that maximizes spherical coverage.

In another embodiment the relays have a mechanism to decide their codebook based on vehicle configuration.

In one example, if the vehicle is running at a high speed, the relays may use codebook that has broad beams knowing that there could be frequent handovers. If the vehicle is stationary, the relays may use a codebook that can offer narrow beams. The relays may also have a mechanism for suggesting codebook for the UEs inside the vehicle. The codebook suggestion from the relays could be a function of the vehicle configuration. For instance, if a left window is open but a right window is closed, the relay may suggest the UE to use a codebook which may be different than if all windows are closed.

Figure 18:
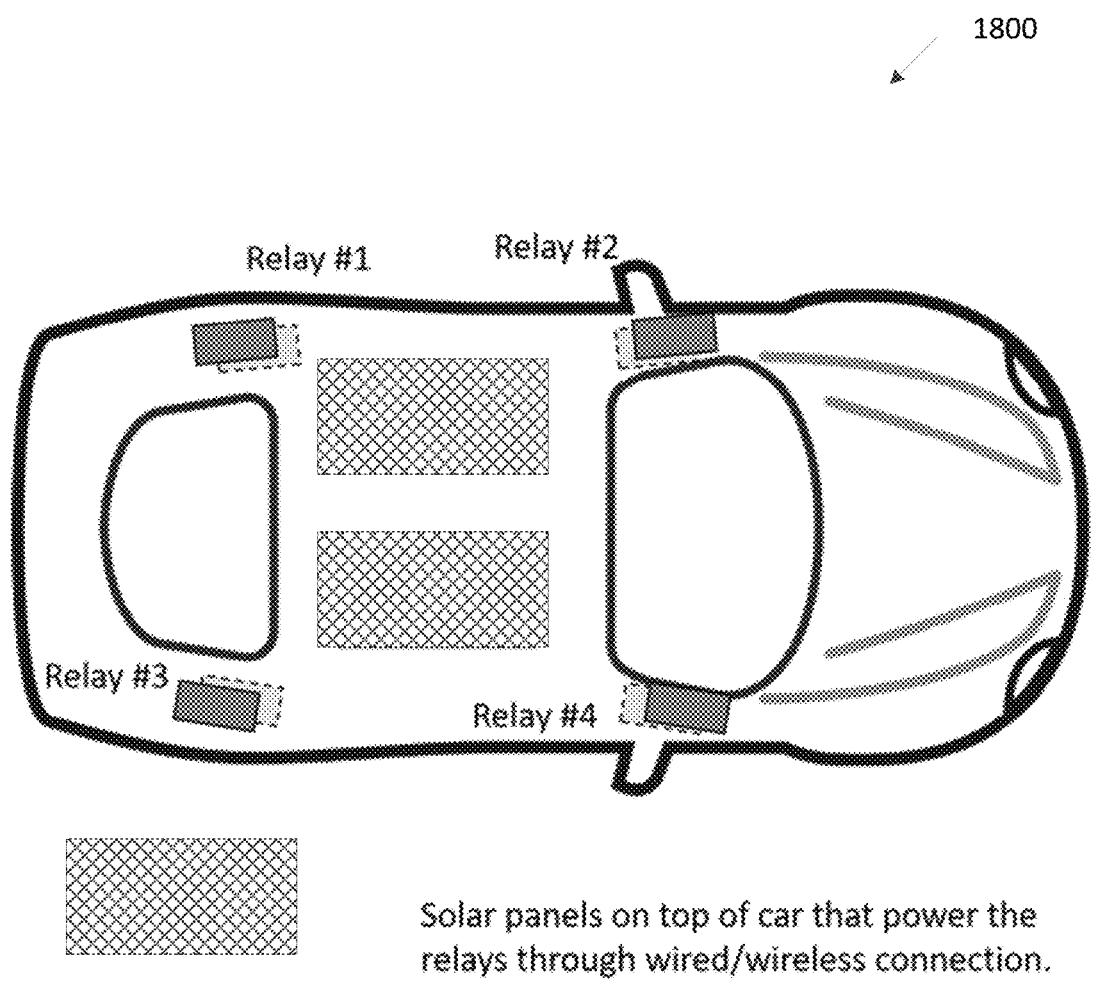
FIG. 18 illustrates an example solar powered relay according to embodiments of the present disclosure.

FIG. 18 illustrates an example solar powered relay 1800 according to embodiments of the present disclosure. The embodiment of the solar powered relay 1800 illustrated in FIG. 18 is for illustration only. FIG. 18 could have the same or similar configuration. FIG. 18 does not limit the scope of the present disclosure to any particular implementation.

In one embodiment, the relays are solar powered and there is one or more solar panel installed on the outside surface of the car. Such relays have an advantage that can provide service to the UEs even if the car is powered OFF. In another embodiment, the relays are powered by car battery. FIG. 18 summarizes these embodiments.

Figure 19:
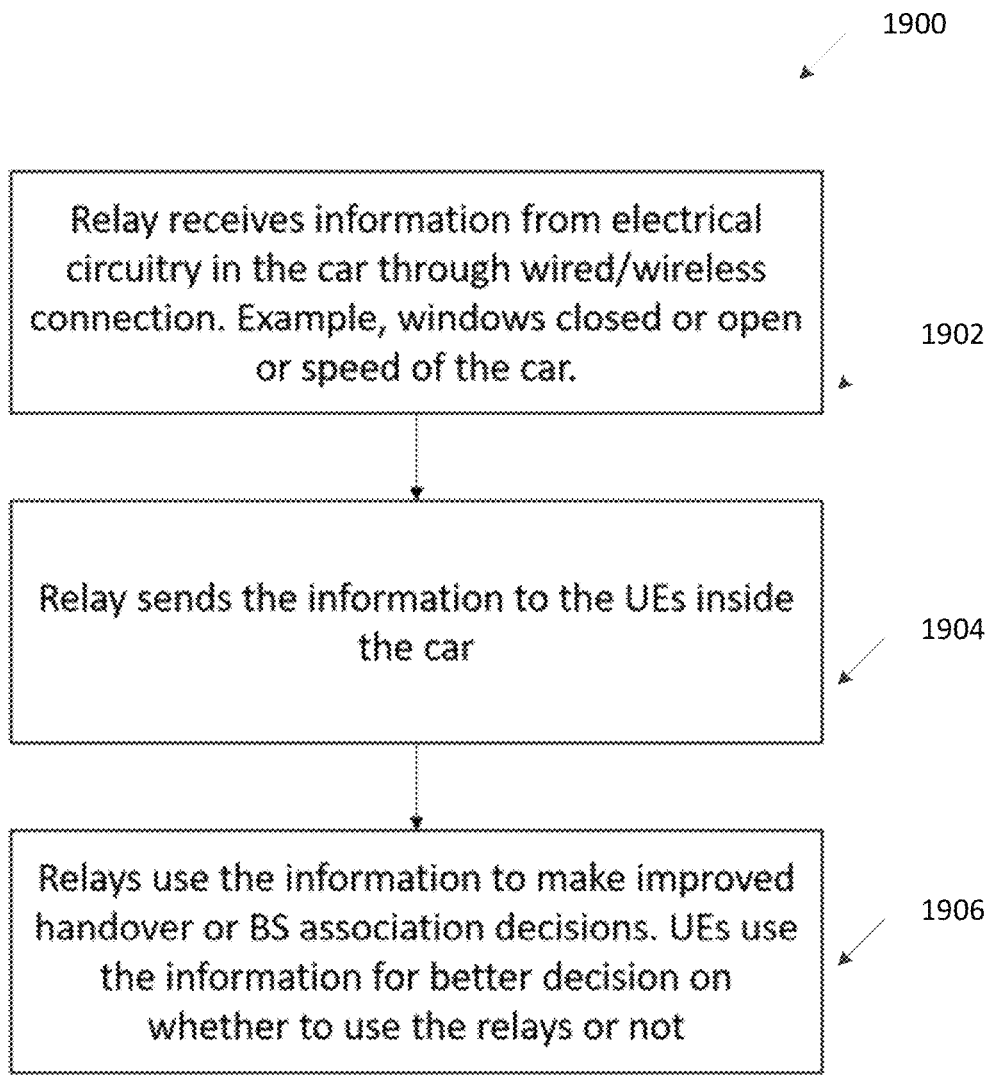
FIG. 19 illustrates an example mechanism for obtaining and using information from car electrical circuitry by the relays according to embodiments of the present disclosure.

FIG. 19 illustrates an example mechanism 1900 for obtaining and using information from car electrical circuitry by the relays according to embodiments of the present disclosure. The embodiment of the mechanism 1900 illustrated in FIG. 19 is for illustration only. FIG. 19 could have the same or similar configuration. FIG. 19 does not limit the scope of the present disclosure to any particular implementation.

As illustrated in FIG. 19, in step 1902 a relay receives information from electrical circuitry in a car through wired/wireless connection, for example, windows closed or open or speed of the car. In step 1904, the relay sends the information to the UEs inside the car. In step 1906, the relay uses the information to make improved handover or BS association decision. In step 1906, the UEs use the information for better decision on whether to use the relay or not.

In one embodiment, the relays have access to some information from the car circuitry. For instance, whether the windows are closed or open. Such information may be useful for deciding whether the UE uses the relays or not for transmitting to the BS.

In another embodiment, information from car circuitry can be the speed of the car, which can help the relays to make decisions on handovers or beam tracking. FIG. 19 summarizes the high-level steps for these embodiments.

Figure 20:
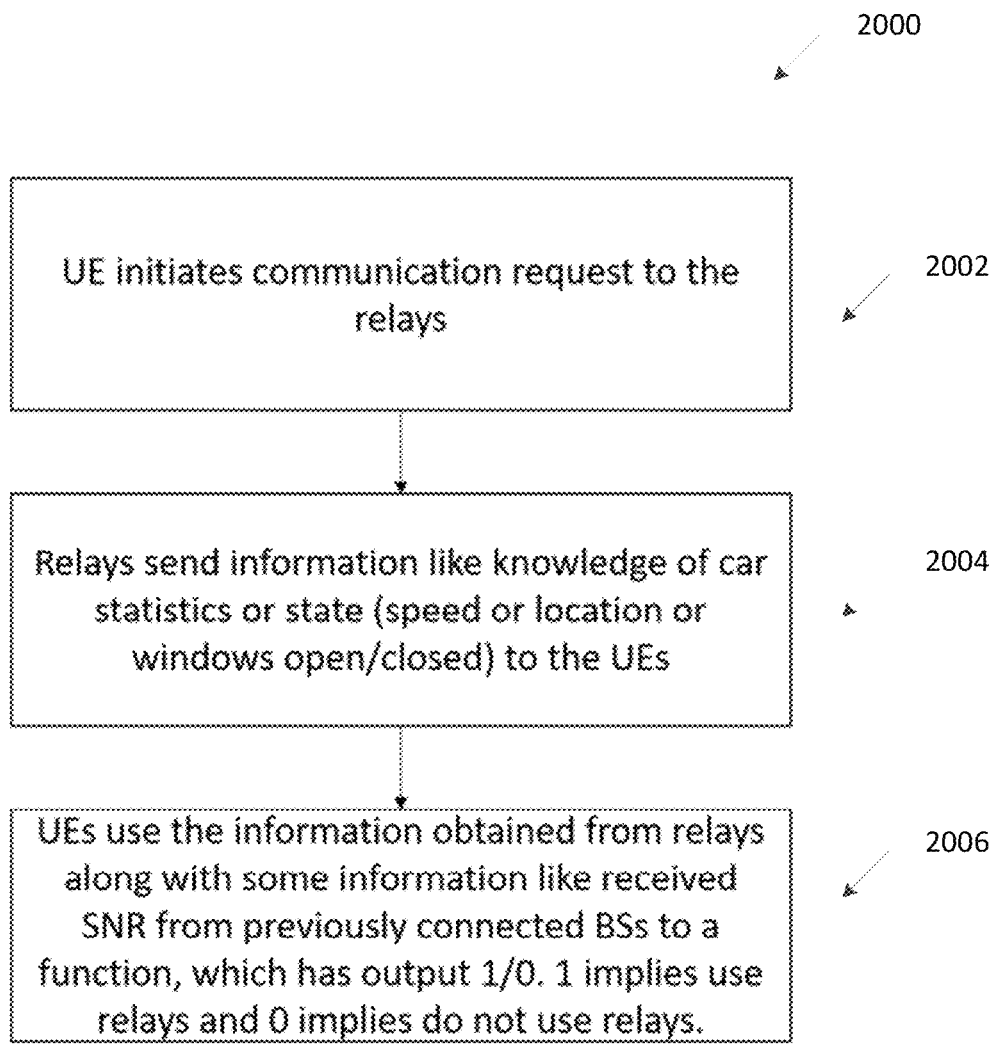
FIG. 20 illustrates an example mechanism by UEs to decide whether to use relays or not according to embodiments of the present disclosure.

FIG. 20 illustrates an example mechanism 2000 by UEs to decide whether to use relays or not according to embodiments of the present disclosure. The embodiment of the mechanism 2000 illustrated in FIG. 20 is for illustration only. FIG. 20 could have the same or similar configuration. FIG. 20 does not limit the scope of the present disclosure to any particular implementation.

As illustrated in FIG. 20, in step 2002, a UE initiates communication request to the relays. In step 2004, relays send information like knowledge of car statistics or state (e.g. speed or location or windows open/closed) to the UEs. In step 2006, the UEs use the information obtained from relays along with some information like received SNR from previously connected BSs to a function, which has output 1/0. 1 implies use relays and 0 implies do not use the relays.

In one embodiment, the UE has a software application to select whether user prefers to use the relays when inside car or no relays or whether he/she prefers to use an inbuilt algorithm that decides whether to use relays or not. The inbuilt algorithm may have inputs like whether the car windows are open or closed, speed of car, past history based on location, UE orientation and handgrip, received SNR in previous frames, etc. An example mechanism for choosing relays or not is shown in FIG. 20.

In one embodiment, the UE changes a codebook choice depending on whether it is communicating via relays or not. In one example, a UE can use omni-directional transmission or broad beams if the UE communicates via relays since the hop between UE to inside antenna module of the relays is a short hop.

In one embodiment, the repeaters on car are detachable. These could then be used by the user for other scenarios including indoor office scenarios. Since choice of optimal codebook/code word may depend on UE orientation and blockage effects, it would be sometimes desirable to have the UEs communicate in omni-directional mode even when the UE is outdoors.

In such embodiment, battery power can be saved, the need for computation in deciding codebook and latency in initial access. The reduced signal power due to omni transmission compared to beamforming is then compensated by having some repeaters installed by the user in his surroundings. Since the repeaters are not handled by UEs and are stationed at a fixed location, these repeaters do not suffer UE orientation and handgrip issues.

Figure 21:
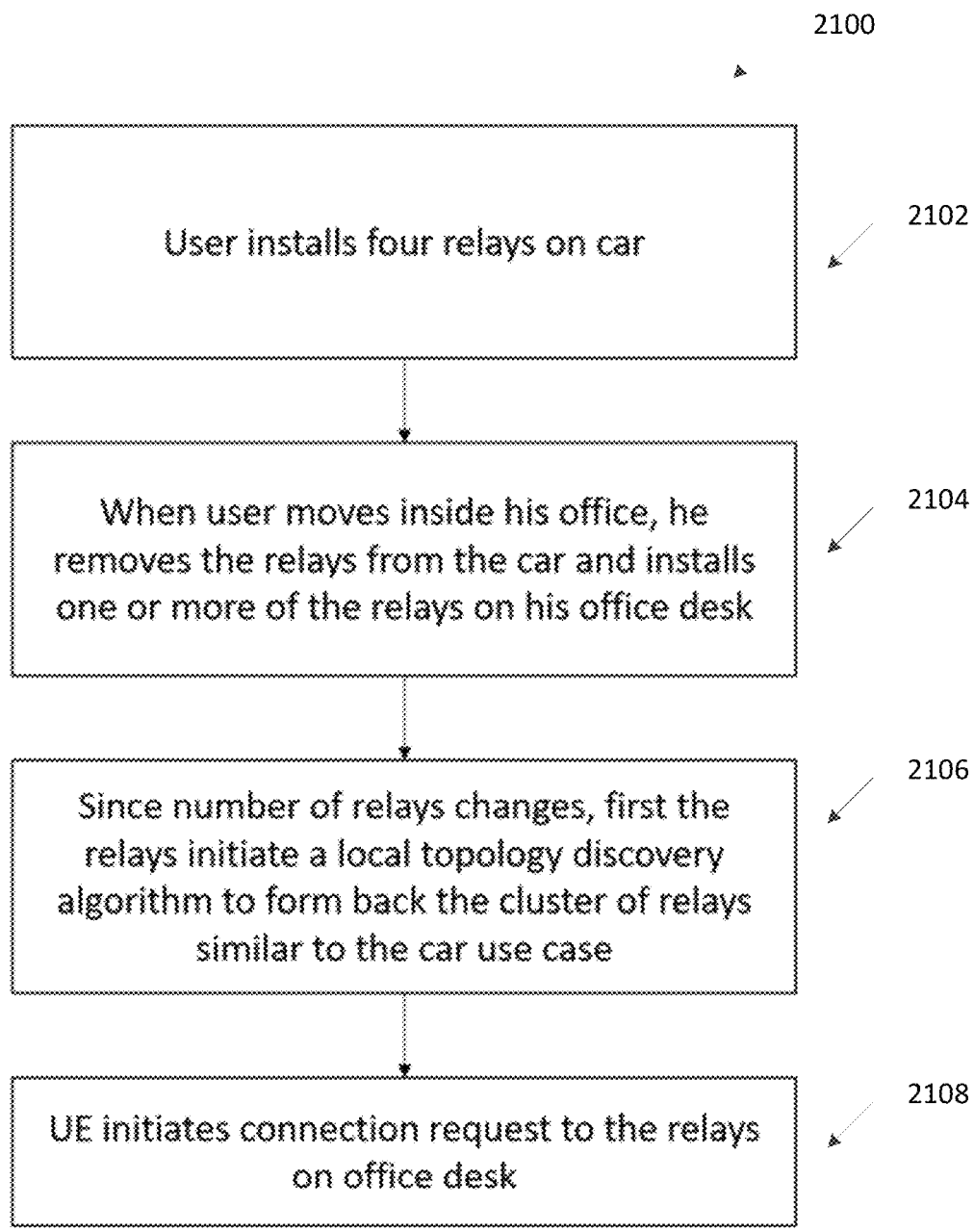
FIG. 21 illustrates an example use and mechanism for detachable relays according to embodiments of the present disclosure.

FIG. 21 illustrates an example use and mechanism 2100 for detachable relays according to embodiments of the present disclosure. The embodiment of the use and mechanism 2100 illustrated in FIG. 21 is for illustration only. FIG. 21 could have the same or similar configuration. FIG. 21 does not limit the scope of the present disclosure to any particular implementation.

FIG. 21 shows one use case of detachable repeaters. As illustrated in FIG. 21, since the topology of relays can change in detachable relay case there exists a local topology discovery mechanism wherein the relays owned by the same user communicate with each other to identify how the relays are installed in the current scenario including decisions for which relays perform DL and UL operation, and what codebook to use for each relay. Depending on the local discovery mechanism, the beam management done by the relays including choosing which relays do downlink and which relays do uplink can change.

As illustrated in FIG. 21, in step 2102, a user installs four relays on a car. In step 2104, when the user moves inside user's office, the user removes the relays from the car and install one or more of the relays on the user's office. In step 2106, since number of relays changes, first the relay initiates a local topology discovery algorithm to form back the cluster of relays similar to the car use case. In step 2108, a UE initiates connection request to the relays on an office desk.

In one embodiment, the detachable repeaters can be programmed to operate in different modes—like in-car mode or in-office mode. A UE can set the mode of the repeater during the connection initiation request. This embodiment enables using detachable relays with pre-defined configurations which the user can set and thus removes the need for having a local topology discovery by the relays.

Figure 22:
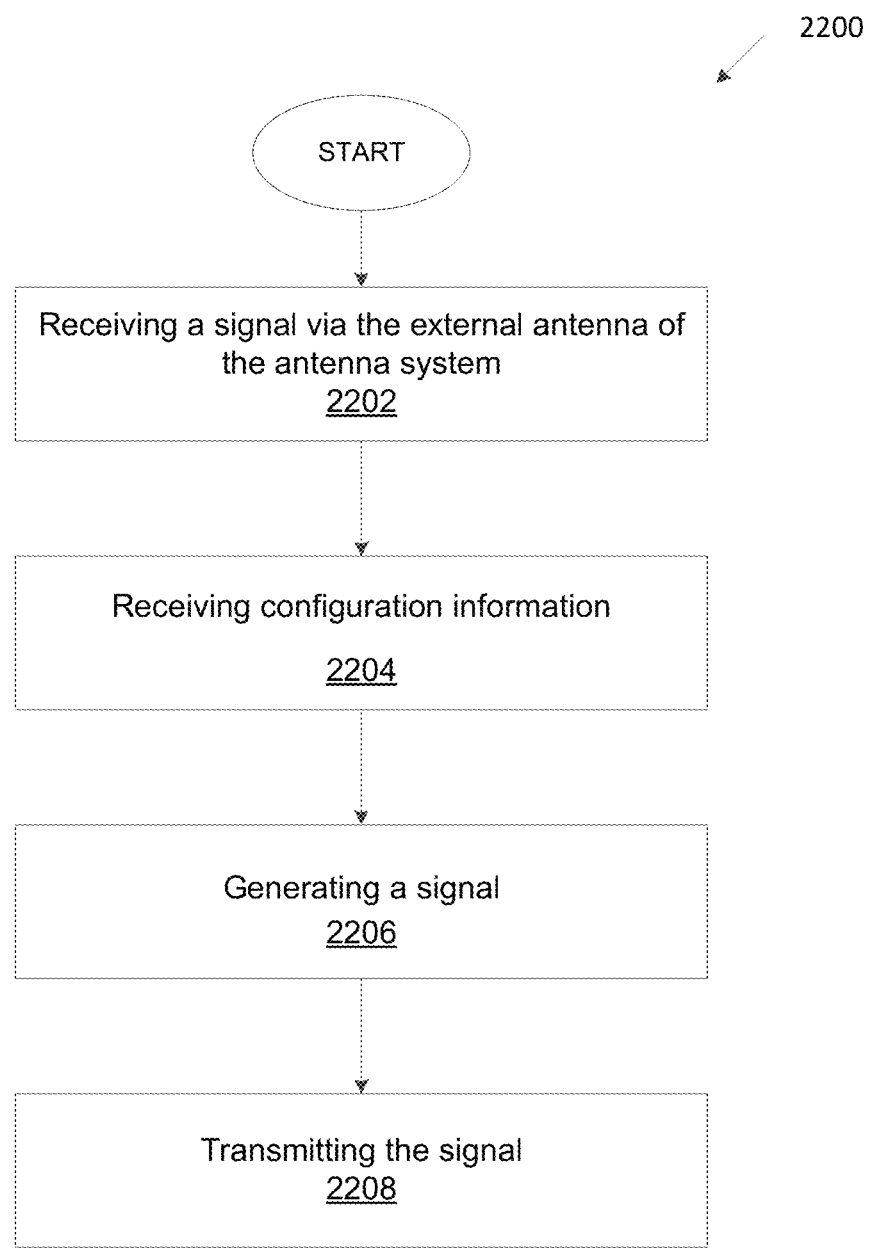
FIG. 22 illustrates a flow chart of a method for beam management according to embodiments of the present disclosure.

FIG. 22 illustrates a flow chart of a method 2200 for beam management according to embodiments of the present disclosure, as may be performed by a relay (e.g., relay #1 to #4 as illustrated in FIG. 12 and FIG. 18). The embodiment of the method 2200 illustrated in FIG. 22 is for illustration only.

FIG. 22 could have the same or similar configuration. FIG. 22 does not limit the scope of the present disclosure to any particular implementation.

As illustrated in FIG. 22, the method 2200 begins at step 2202. In step 2202, the relay receives, from a BS (e.g., 101-103 as illustrated in FIG. 1), from a first signal via the external antenna of the antenna system. The relay is configured with an antenna system including an internal antenna located inside a vehicle and an external antenna located outside the vehicle.

In some embodiments, the relay is connected to the vehicle via a wireless connection or a secure wired connection, and wherein the relay is a portable relay that is detachable from the vehicle.

In some embodiments, the relay uses a codebook to generate the second signal and select the codebook based on at least one of the position of the antenna system mounted in the vehicle, the position of the window of the vehicle of the windshield wiper, or the vehicle speed. In such embodiment, the codebook provides information for a type of available beams based on the vehicle configuration including the vehicle speed.

Subsequently, in step 2204, the relay receives, from the vehicle, configuration information including at least one of vehicle speeds, or a position of a window of the vehicle or windshield wiper.

Next, in step 2206, the relay generates a second signal based on (i) the configuration information and (ii) the first signal.

Finally, in step 2208, the relay transmits, to a user equipment (UE), the second signal via the internal antenna.

In some embodiment, the relay receives, from the UE, a command requesting amplification or attenuation for the second signal and transmits, to the UE, a third signal that is amplified or attenuated based on the received command.

In some embodiments, the relay receives, from the UE, battery information of the UE and enables, based on the battery information of the UE, the external antenna for reception of the first signal from the BS or to enable the internal antenna for transmission of the second signal to the UE.

In some embodiment, the UE transmits an acknowledgement corresponding to the received command to the UE.

In some embodiments, a group of relays comprising the relay is mounted in the vehicle and includes at least one controller relay that combines the second signal from each relay of the group of relays to generate a third signal, and transmits, to the UE, the third signal.

In some embodiments, the relay receives, from the UE, a command requesting a gain control for the second signal. In such embodiments, the relay adjusts a gain of the second signal based on the received command. In such embodiments, the relay transmits, to the UE, a third signal that is adjusted based on the gain of the second signal.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A relay for beam management in a vehicle communication system, the relay comprising:
   an antenna system including an internal antenna located inside a vehicle and an external antenna located outside the vehicle;
   a transceiver operably connected to the antenna system, the transceiver configured to:
     receive, from a base station (BS), a first signal via the external antenna of the antenna system, and
     receive, from the vehicle, configuration information including at least one of a vehicle speed, a position of a window of the vehicle, or a windshield wiper; and
   a processor operably connected to the antenna system and the transceiver, the processor configured to generate a second signal based on (i) the configuration information and (ii) the first signal,
   wherein the transceiver is further configured to transmit via the internal antenna, to a user equipment (UE), the second signal.

2. The relay of claim 1, wherein the transceiver is further configured to:
   receive, from the UE, a command requesting amplification or attenuation for the second signal; and
   transmit, to the UE, a third signal that is amplified or attenuated based on the received command.

3. The relay of claim 1, wherein the transceiver is further configured to transmit, to the UE, an acknowledgement corresponding to the received command.

4. The relay of claim 1, wherein the relay is connected to the vehicle via a wireless connection or a secure wired connection, and wherein the relay is a portable relay that is detachable from the vehicle.

5. The relay of claim 1, wherein:
   the processor is further configured to:
     apply a codebook to generate the second signal, and
     select the codebook based on at least one of the position of the antenna system mounted in the vehicle, the position of the window of the vehicle or the windshield wiper, or the vehicle speed; and
   the codebook provides information for a type of available beams based on the configuration information including the vehicle speed.

6. The relay of claim 1, wherein:
   the transceiver is further configured to receive, from the UE, battery information of the UE; and
   the processor is further configured to enable, based on the battery information of the UE, the external antenna for reception of the first signal from the BS or to enable the internal antenna for forwarding the first signal to the UE.

7. A group of relays comprising the relay of claim 1, wherein the group of relays is mounted in the vehicle and includes at least one controller relay configured to:
   combine the second signal from each relay of the group of relays to generate a third signal; and
   transmit, to the UE, the third signal.

8. A relay for beam management in a vehicle communication system, the relay comprising:
   an antenna system including an internal antenna located inside a vehicle and an external antenna located outside the vehicle;
   a transceiver operably connected to the antenna system, the transceiver configured to:

receive, from the vehicle, configuration information including at least one of a vehicle speed, a position of a window of the vehicle, or windshield wiper, and receive, from UE, a first signal via the internal antenna of the antenna system based on the configuration information; and a processor operably connected to the antenna system and the transceiver, the processor configured to generate a second signal based on the first signal, wherein the transceiver is further configured to transmit, to a base station (BS), the second signal via the external antenna of the antenna system.

9. The relay of claim 8, wherein the transceiver is further configured to transmit, to the UE via the internal antenna of the antenna system, a third signal based on the configuration information.

10. The relay of claim 8, wherein the transceiver is further configured to:

receive, from the UE, a command requesting amplification or attenuation for a third signal; and transmit, to the UE, the third signal that is amplified or attenuated based on the received command.

11. The relay of claim 10, wherein the transceiver is further configured to transmit, to the UE, an acknowledgement corresponding to the received command.

12. The relay of claim 8, wherein the relay is connected to the vehicle via a wireless connection or a secure wired connection, and wherein the relay is a portable relay that is detachable from the vehicle.

13. The relay of claim 8, wherein:

the processor is further configured to:

apply a codebook to generate a third signal, and select the codebook based on at least one of the position of the antenna system mounted in the vehicle, the position of the window of the vehicle or the windshield wiper, or the vehicle speed; and the codebook provides information for a type of available beams based on the configuration information including the vehicle speed.

14. The relay of claim 8, wherein:

the transceiver is further configured to receive, from the UE, battery information of the UE; and the processor is further configured to enable, based on the battery information of the UE, the external antenna to transmit, to the BS, the second signal or to enable the internal antenna to receive, from the UE, the first signal.

15. A group of relays comprising the relay of claim 8, wherein the group of relays is mounted in the vehicle and includes at least one controller relay configured to:

combine signals from each relay of the group of relays to generate a third signal; and transmit, to the UE, the third signal.

16. A user equipment (UE) for beam management in a vehicle communication system, the UE comprising:

a transceiver configured to receive, from at least one relay of a group of relays, a second signal, wherein the at least one relay of the group of relays includes an external antenna located inside a vehicle and an external antenna located outside the vehicle, and wherein the second signal is determined based on (i) a first signal that is received, from a base station (BS), by the at least one relay of the group of relays and (ii) configuration information, received from the vehicle, including at least one of a vehicle speed, a position of a window of the vehicle, or windshield wiper; and a processor operably connected to the transceiver, the processor configured to generate a command based on the received second signal, wherein the transceiver is further configured to transmit, to the at least one relay of the group of relays, the command.

17. The UE of claim 16, wherein:

the processor is further configured to identify battery information of the UE; and the transceiver is further configured to transmit, to the at least one relay of the group of relays, the battery information of the UE.

18. The UE of claim 16, wherein the transceiver is further configured to receive, from the at least one relay of the group of relays, a signal that is combined signals from at least two relays of the group of relays.

19. The UE of claim 16, wherein the transceiver is further configured to:

transmit, to the at least one relay of the group of relays, the command requesting a gain control for the second signal; and receive, from the at least one of the group of relays, a third signal that is adjusted based on a gain of the second signal.

20. The UE of claim 19, wherein the transceiver is further configured to receive, from the at least one of the group of relays, an acknowledgement corresponding to the command.

* * * * *